(12) United States Patent
Murakami

(10) Patent No.: US 7,852,394 B2
(45) Date of Patent: Dec. 14, 2010

(54) DRIVING METHOD FOR SOLID-STATE IMAGING DEVICE AND SOLID-STATE IMAGING DEVICE

(75) Inventor: Ichiro Murakami, Kyoto (JP)

(73) Assignee: Panasonic Corporation, Osaka (JP)

( * ) Notice: Subject to any disclaimer, the term of this patent is extended or adjusted under 35 U.S.C. 154(b) by 478 days.

(21) Appl. No.: 11/763,568

(22) Filed: Jun. 15, 2007

(65) Prior Publication Data

US 2008/0012970 A1    Jan. 17, 2008

(30) Foreign Application Priority Data

Jul. 11, 2006   (JP) .............................. 2006-190104
Feb. 2, 2007    (JP) .............................. 2007-024576

(51) Int. Cl.
   *H04N 5/335*   (2006.01)
   *G03B 7/00*    (2006.01)

(52) U.S. Cl. ........................................ 348/317; 348/362

(58) Field of Classification Search ......... 348/248–250, 348/311–323, 362–368
See application file for complete search history.

(56) References Cited

U.S. PATENT DOCUMENTS

| 4,758,895 A * | 7/1988 | Elabd .......................... 348/319 |
| 5,418,564 A   | 5/1995 | Aoki et al. |
| 5,430,481 A * | 7/1995 | Hynecek ..................... 348/317 |
| 5,543,837 A   | 8/1996 | Aoki et al. |
| 5,648,817 A   | 7/1997 | Aoki et al. |
| 6,549,647 B1* | 4/2003 | Skunes et al. ................ 382/150 |
| 2002/0141002 A1* | 10/2002 | Takano et al. ............... 358/513 |
| 2006/0209204 A1* | 9/2006 | Ward .......................... 348/362 |

FOREIGN PATENT DOCUMENTS

| JP | 6-207851 | 7/1994 |
| JP | 9-116815 | 5/1997 |
| JP | 9-149425 | 6/1997 |

OTHER PUBLICATIONS

English language Abstract of JP 6-207851.
English language Abstract of JP 9-116815.
English language Abstract of JP 9-149425.
U.S. Appl. No. 11/735,740 to Murakami, which was filed on Apr. 16, 2007.
U.S. Appl. No. 11/767,087 to Murakami, which was filed on Jun. 22, 2007.

* cited by examiner

*Primary Examiner*—Sinh Tran
*Assistant Examiner*—Mark Monk
(74) *Attorney, Agent, or Firm*—Greenblum & Bernstein P.L.C.

(57) ABSTRACT

The present invention is to provide a driving method for a solid-state imaging device which suppresses increase of smear and occurrence of image blur when imaging a moving object.

In the driving method, for each row of the color filters arranged in the Bayer pattern, for a pixel, a signal charge is held in a first holding unit, which is generated in a preceding field period temporally preceding a predetermined field out of two different fields temporally equidistant from the predetermined field, a first signal charge is held in a second holding unit, which is generated within the predetermined field, the signal charge held in the first holding unit and a signal charge which is generated in a following field period are added, and a second signal charge obtained by the addition and the first signal charge are respectively outputted to outside of the solid-state imaging device.

7 Claims, 17 Drawing Sheets

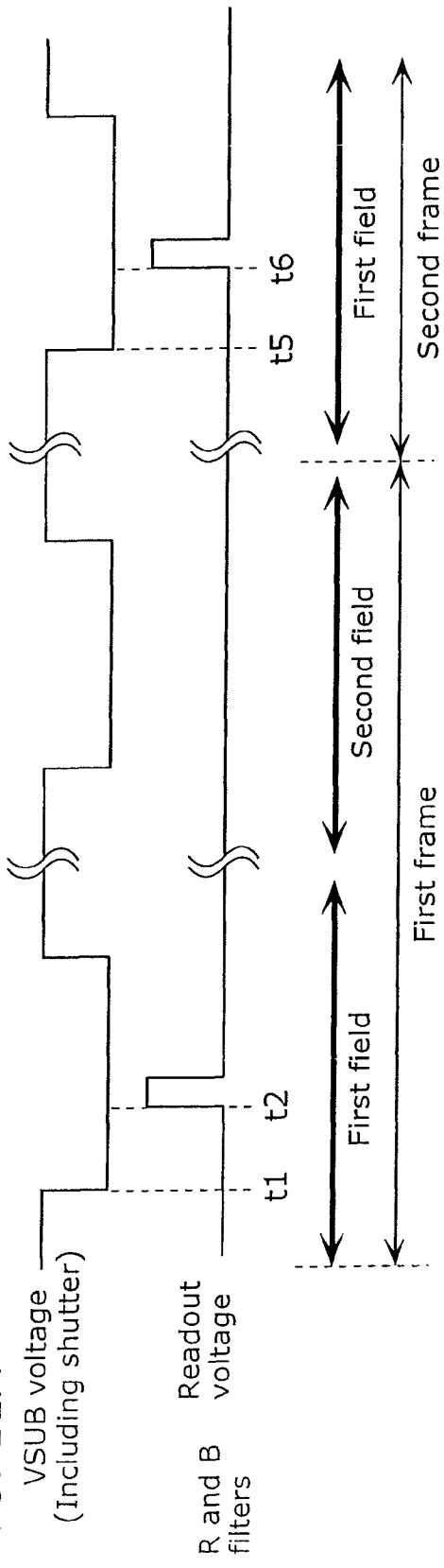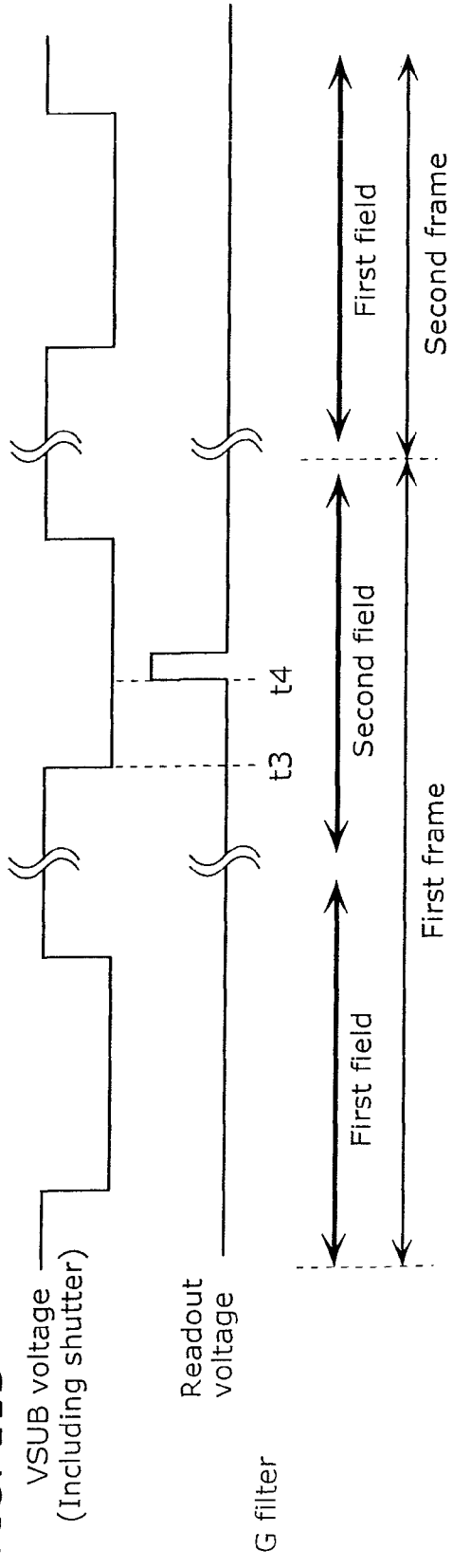

DRIVING METHOD FOR SOLID-STATE IMAGING DEVICE AND SOLID-STATE IMAGING DEVICE

BACKGROUND OF THE INVENTION (1) Field of the Invention

The present invention relates to a solid-state imaging device.

(2) Description of the Related Art

In recent years, demand for video cameras and digital still cameras tends to increase year by year. With increase in demand, clientele is broadened. There is a demand for a low-cost camera which can capture images in which noise caused by smear and the like are reduced, not only from a conventional clientele but also from a new clientele. In addition, there is a demand for improved resolution not only for a still image but also for a moving picture in movie cameras and some DSC cameras. Thus, development that meets customers' needs is required for a solid-state imaging device, particularly, a charge coupled device (CCD) solid-state imaging device, to be used in a camera. In order to lower the cost, it is effective to increase the number of chips per a wafer. Thus, further miniaturization of a chip is necessary.

Hereafter, a conventional CCD image sensor is described first, and a smear which occurs when miniaturizing chips is described next.

FIG. 1 shows a configuration of the conventional CCD image sensor. The CCD image sensor includes: photodiodes 901 arranged in a matrix; transfer gates 902, each of which is provided for each of the photodiodes 901; vertical CCDs 903, each of which is a charge transfer path in a vertical direction arranged on a left side of each row of the photodiodes 901; a horizontal CCD 907, each of which is a charge transfer path in a horizontal direction arranged at lower ends of the rows of the vertical CCDs 903; and an output unit 908 which outputs a voltage value corresponding to charge to outside of the CCD image sensor. The photodiode 901 converts incident light to a charge and the corresponding transfer gate 902 transfers the charge converted by photoelectric conversion to the corresponding vertical CCD 903. The vertical CCD 903 transfers the transferred charge to the horizontal CCD 907. The horizontal CCD 907 transfers the charge transferred from the vertical CCDs 903 to the output unit 908. The output unit 908 converts the charge to voltage, and outputs data including the obtained voltage value to outside of the CCD image sensor.

Next, the cause of smear is described.

FIG. 2 is a cross section diagram of a pixel of a typical CCD solid-state imaging device. In the solid-state imaging device, a photodiode unit (photoelectric conversion unit) 4 includes an n-type silicon substrate 10, a p$^{--}$-type well region 11, an n-type charge accumulation region 12, and a p$^{++}$-type region 13. A vertical CCD unit 5 for transferring the signal charge obtained by a photoelectric conversion includes an n-type buried channel region 14, a p-type region 15 which is formed under the n-type buried channel region 14, a gate electrode 16 made of a polysilicon film and the like.

A transfer gate 17 unit is formed between the photodiode unit 4 and the vertical CCD unit 5, and a p$^{+}$-type channel stop region 18 is formed at a position opposite to the transfer gate unit 17 with respect to the photodiode unit 4. The transfer gate unit 17 and the p$^{+}$-type channel stop region 18 interpose the photodiode unit 4. A gate insulator film 19 having a lamination structure of a silicon oxide film and a silicon nitride film is formed on the n-type buried channel region 14, the transfer gate unit 17 and the p$^{+}$-type channel stop region 18. A light shielding film 8 such as a tungsten film is formed on the gate electrode 16 with an interlayer insulator film 20 interposed therebetween. A reflection preventing film 21 is formed on a surface of the photodiode unit 4.

Smear occurs due to the following reason. That is, upon accumulation of charges obtained through photoelectric conversion, the charges flow into the vertical CCD unit 5 without being accumulated in the photodiode unit 4, so that a false signal is generated. This is described with reference to FIG. 2. It is considered that smear mainly occurs due to the following four causes. (i) Light transmits through the light shielding film 8, reaches the vertical CCD unit 5, and is converted into electric charges in the vertical CCD unit 5, so that smear occurs. (ii) Incident light is partially leaked from an interface between the light shielding film 8 and the gate insulator film 19, and then transmits to the vertical CCD unit 5 while multiply reflecting in the light shielding film 8, between the gate insulator film 19 and the gate electrode 16, and between the gate insulator film 19 and the light shielding film 8. Thereafter, the light is converted into charges in the vertical CCD unit 5, so that smear occurs. (iii) Charges generated through photoelectric conversion at an exterior of the photodiode unit 4 are diffused, and then reach the vertical CCD unit 5, so that smear occurs. (iv) Charges generated through photoelectric conversion at a recombination region in the p$^{++}$-type region 13 on the surface of the photodiode unit 4 are transferred or diffused by a weak electric field. Thereafter, the charges reach the vertical CCD unit 5, and then are detected as false signals, so that smear occurs.

It is considered that smear occurs due to the aforementioned causes. In response to formation of a finer pixel, countermeasures against smear are constantly required. This is due to the following reasons. In the case where a pixel size is simply reduced in size, a width of the transfer gate 17 shown in FIG. 2, that is, a distance between the photodiode unit 4 and the vertical CCD unit 5 becomes short. Thus, a light transmission distance in the aforementioned case (ii) becomes short, for example. Consequently, an amount of the light absorbed upon transmission decreases, and the light is more likely to reach the vertical CCD unit 5, resulting in increase of smear. In addition, since an charge diffusion distance in the aforementioned case (iii) or (iv) becomes short, the charge is more likely to reach the vertical CCD unit 5, resulting in increase of smear. As described above, the simple reduction in pixel size causes increase of smear.

In order to suppress the increase of smear, it is effective to narrow down the width of the vertical CCD unit 5 shown in FIG. 2 (see, for example, Japanese Unexamined Patent Application Publication No. 9-149425). More specifically, the vertical CCD unit 5 is designed so that the distance between the photodiode unit 4 and the vertical CCD unit 5 does not change even if a pixel is reduced. With this, a shrinkage of propagation distance of the light to the vertical CCD unit 5 in the aforementioned case (ii), and a shrinkage of transmission distance of charge to the vertical CCD unit 5 in the aforementioned case (iii) or (iv). The increase of smear can be suppressed with this method.

However, when the width of the vertical CCD unit 5 is narrowed down, it is extremely difficult to prevent decrease of the maximum amount of charge which the vertical CCD unit 5 is capable of transferring. This is due to decrease in capacity of a capacitor which is formed, between the gate electrode 16 in the upper part of the vertical CCD unit 5 and the n-type buried channel region 14 in the lower part of the vertical CCD unit 5, caused by a decrease in a charge transfer area. Thus, an uneven saturation caused by the vertical CCD unit 5 is likely to occur, and a problem such as a decrease in dynamic range occurs.

As a countermeasure of the problem, instead of the so-called progressive method in which one frame includes one field, and the charge generated in one frame is transferred at one time, a method in which one frame includes multiple fields, and the charge generated in one frame is transferred in multiple times is used. With this method, uneven saturation and the like can be prevented even if the width of the vertical CCD unit 5 is narrowed down.

However, when transferring the charge generated in one frame in multiple fields, a problem such that temporal resolution degrades occurs. For example, when a frame includes two fields, a temporal difference in the amount of the first charge and the second charge occurs for the same pixel. This is due to a difference in time when the first charge is generated in the first field and when the second charge is generated in the second field. With this, malfunctions such that image becomes out of focus when imaging a moving object, and a blurred image is generated occur.

SUMMARY OF THE INVENTION

An object of the present invention is to provide a driving method for a solid-state imaging device in which increase of smear is suppressed, and an image blur does not occur when imaging a moving object and a solid-state imaging device using the driving method.

In order to solve the abovementioned problem and achieve the object, the driving method for the solid-state imaging device according to the present invention, having pixels arranged in a matrix and color filters which are arranged in the Bayer pattern and are provided above each of the pixels, the method including: for each row of the color filters arranged in the Bayer pattern, a first holding step of holding, for a pixel of a first color, a signal charge in a first holding unit, the signal charge being generated from incident light during an accumulation period of a field period which temporally precedes a predetermined field, out of two different fields located at a temporally equal distance from the predetermined field, and the two different fields and the predetermined field being included in a frame; a second holding step of holding, for a pixel of a second color, a first signal charge in a second holding unit, the first signal charge being generated from incident light during the accumulation period of the predetermined field; an adding step of adding, for the pixel of the first color, the signal charge held in the first holding unit and a signal charge which is generated from incident light during the accumulation period of a field which temporally follows the predetermined field out of the two different fields so as to obtain a second signal charge; and an output step of respectively outputting the first signal charge held in the second holding step and the second signal charge obtained in the adding step, to outside of the solid-state imaging device.

With this method, it is possible to achieve a driving method for the solid-state imaging device which suppresses increase of smear, and prevents blurring of an image when imaging a moving object.

For example, the frame includes a temporal series of a first field, a second field, and a third field, the predetermined field is the second field, the temporally preceding field is the first field, and the temporally following field is the third field.

In addition, for example, the frame and a frame which temporally immediately follows the frame each includes a temporal series of a first and second field, the predetermined field is the second field of the frame, the temporally preceding field is the first field of the frame, and the temporally following field is the first field of the temporally immediately-following frame. With this, high-speed processing can be achieved.

In addition, for example, the second color is a color which corresponds to a wavelength at which sensitivity of the human eyes to color resolution is at the maximum. In addition, for example, the color filters are color filters in primary colors, and the second color is green. In addition, for example, the color filters are color filters in complementary colors, and the second color is green or yellow. Thus, an image in which temporal degradation of resolution is less likely to be perceived in human eyes can be provided.

In addition, for example, an average time between a start time of the accumulation period of the temporally preceding field and a start time of the accumulation period of the temporally following field is made to fall between a start and end of the accumulation period of the predetermined field. With this, the time when the first signal charge is generated and the time when the second signal charge is generated can be virtually matched.

In addition, for example, an average time between an end time of the accumulation period of the temporally preceding field and an end time of the accumulation period of the temporally following field is made to fall between a start and end of the accumulation period of the predetermined field. With this, the time when the first signal charge is generated and the time when the second signal charge is generated can be virtually matched.

In addition, for example, a driving method for the solid-state imaging device having pixels arranged in a matrix and color filters which are arranged in the Bayer pattern and are provided above each of the pixels, the method including: for each row of the color filters arranged in the Bayer pattern, a first holding step of holding, for a pixel of a first color, a first signal charge in a first holding unit, the first signal charge being generated from incident light during an accumulation period of a field period which temporally precedes a predetermined field, out of two different fields located temporally before and after the predetermined field of a frame, and the two different fields and the predetermined field being included in the frame; a second holding step of holding, for a pixel of a second color, a second signal charge in a second holding unit, the second signal charge being generated from incident light during the accumulation period of the predetermined field; a weighted averaging step of performing, for the pixel of the first color, weighted averaging of the first signal charge held in the first holding unit and a third signal charge, the third signal charge being generated from incident light during an accumulation period of a temporally following field out of two different fields, using a first period and a second period, the first period being a period from a time during accumulation of the first signal charge to a time during accumulation of the second signal charge, and the second period being a period from a time during the accumulation of the second signal charge to a time during accumulation of the third signal charge; and an outputting step of respectively outputting the second signal charge held in the second holding unit and a signal charge which is a result of the weighted averaging performed in the weighted averaging step.

With this, even when the length of the first period is different from the length of the second period, by performing weighted averaging of the first signal charge and the third signal charge which are generated in the field periods of two different fields respectively, using the first period and the second period, the accumulation time of the second signal charge generated in the field period of the predetermined field and the accumulation time of the signal charge obtained by the weighted averaging can be virtually matched together.

A solid-state imaging device having pixels arranged in a matrix and color filters which are arranged in the Bayer pattern and are provided above each of the pixels, the solid-state imaging device including: for each row of the color filters arranged in Bayer pattern, a first holding unit which holds, for a pixel of a first color, a signal charge in a first holding unit, the signal charge being generated from incident light during an accumulation period of a field period which temporally precedes a predetermined field, out of two different fields located at a temporally equal distance from the predetermined field, and the two different fields and the predetermined field being included in a frame; a second holding unit which holds, for a pixel of a second color, a first signal charge in a second holding unit, the first signal charge being generated from incident light during the accumulation period of the predetermined field; an addition unit which adds, for the pixel of the first color, the signal charge held in the first holding unit and a signal charge which is generated from incident light during the accumulation period of a field which temporally follows the predetermined field out of the two different fields, so as to obtain a second signal charge; and an output unit which respectively outputs the first signal charge held in the second holding unit and the second signal charge obtained in the adding unit, to outside of the solid-state imaging device.

With this, a solid-state imaging device in which increase of smear is suppressed, and an image blur does not occur when imaging a moving object can be achieved.

For example, the photoelectric conversion unit has: photodiodes for conversion provided for each of the pixels to convert incident light into charge; first charge transfer paths, each of which is provided for corresponding photodiodes out of the photodiodes for conversion; and first transfer gates, through each of which the charge generated by the photodiode for conversion is transferred to the corresponding first charge transfer path, the first holding unit has: the same number of photodiodes for accumulation as the photodiodes for conversion, which are arranged in the same form as the photodiodes for conversion; second charge transfer paths, each of which is provided for corresponding photodiodes out of the photodiodes for accumulation, and is connected to the corresponding first transfer path; and second transfer gates, through each of which the charge accumulated in the corresponding photodiode for conversion of the photoelectric conversion unit is accumulated in the corresponding photodiode for accumulation and then the accumulated charge is read, and the second charge transfer path functions as the addition unit.

In addition, for example, the second charge transfer path allows a transfer of charge twice as much as or more than charge which can be transferred through the first charge transfer path. With this, it is possible to prevent uneven saturation.

The present invention is to provide a driving method for a solid-state imaging device in which increase of smear is suppressed, and an image blur does not occur when imaging a moving object and a solid-state imaging device using the driving method.

FURTHER INFORMATION ABOUT TECHNICAL BACKGROUND TO THIS APPLICATION

The disclosure of Japanese Patent Application No. 2006-190104 filed on Jul. 11, 2006 including specification, drawings and claims is incorporated herein by reference in its entirety.

The disclosure of Japanese Patent Application No. 2007-024576 filed on Feb. 2, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 11A is a diagram showing pulse waveforms of a VSUB voltage and a read voltage which are for controlling the electronic shutter, in a first field which is included in one frame, according to the third embodiment;

FIG. 11B is a diagram showing pulse waveforms of a VSUB voltage and a read voltage which are for controlling the electronic shutter in a second field which is included in the frame, according to the third embodiment;

FIG. 14 B is a diagram showing pulse waveforms of a VSUB voltage and a read voltage which are for controlling the electronic shutter in a second field which is included in the frame, according to the fourth embodiment;

FIG. 16 B is a diagram showing pulse waveforms of a VSUB voltage and a read voltage in a second field which is included in the frame, according to a modification of the embodiment.

DESCRIPTION OF THE PREFERRED EMBODIMENT(S)

The best modes for embodying the invention will be described below with reference to the drawings.

First Embodiment

First of all, a configuration of a solid-state imaging device according to a first embodiment will be described.

Figure 1:
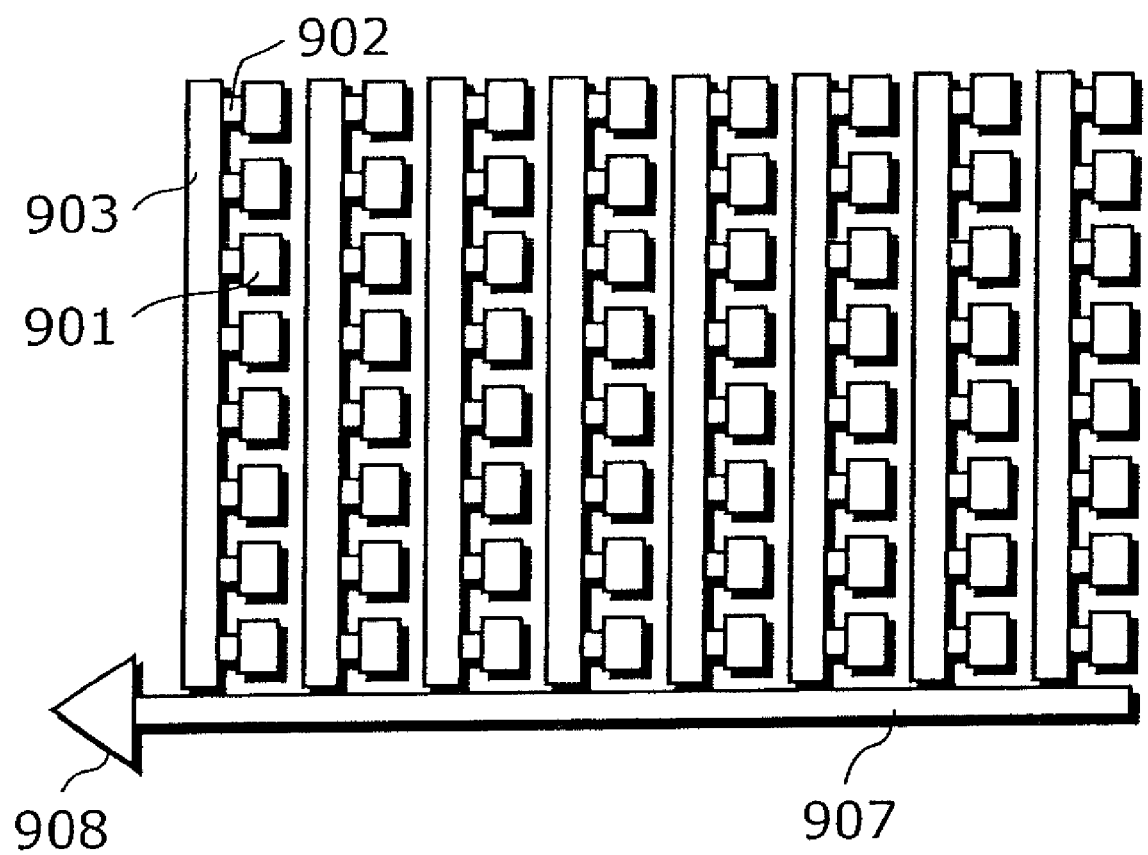
FIG. 1 is a configuration diagram of a typical CCD image sensor.
Figure 2:
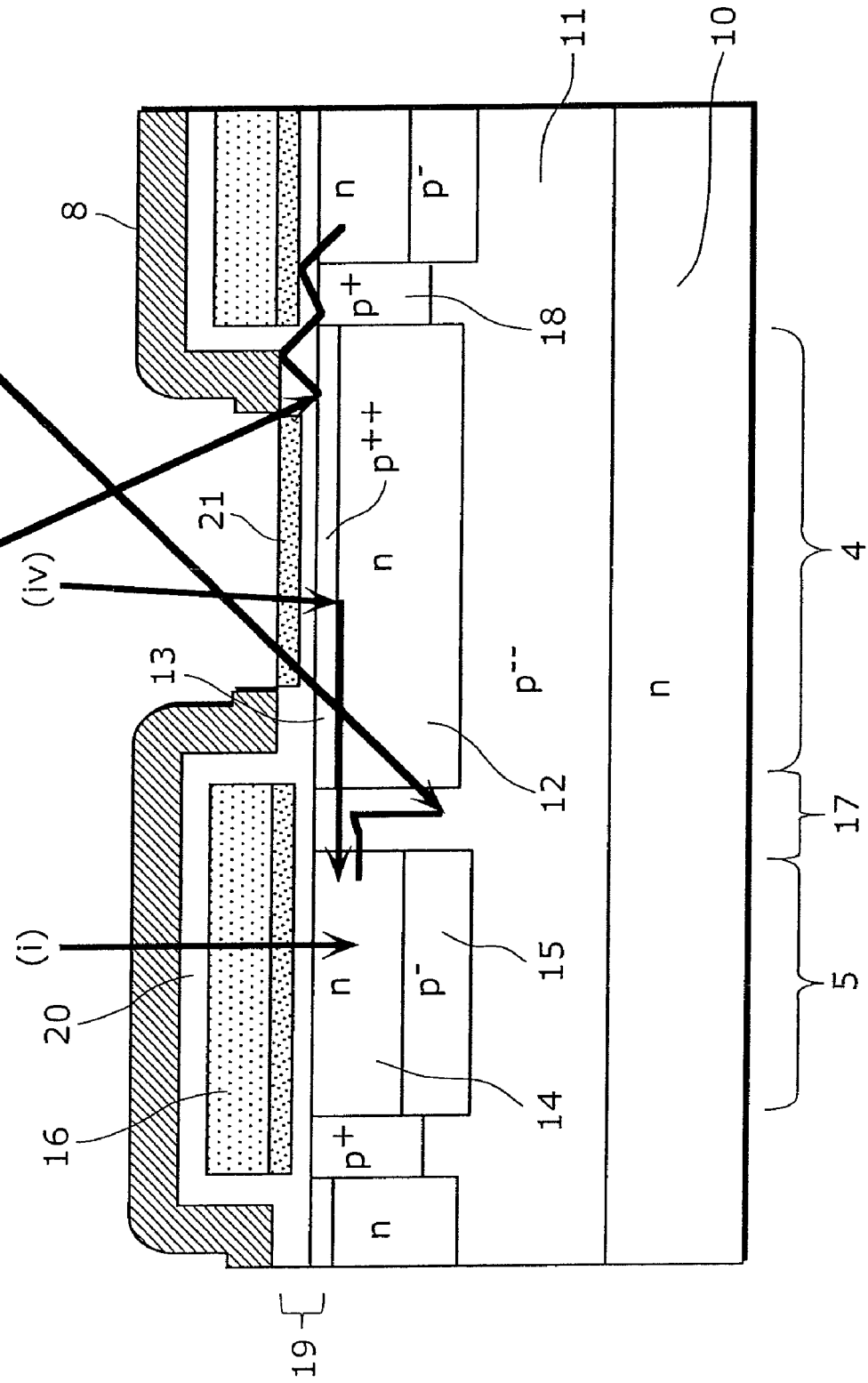
FIG. 2 is a cross sectional diagram of a pixel of a typical CCD solid-state imaging device.
Figure 3:
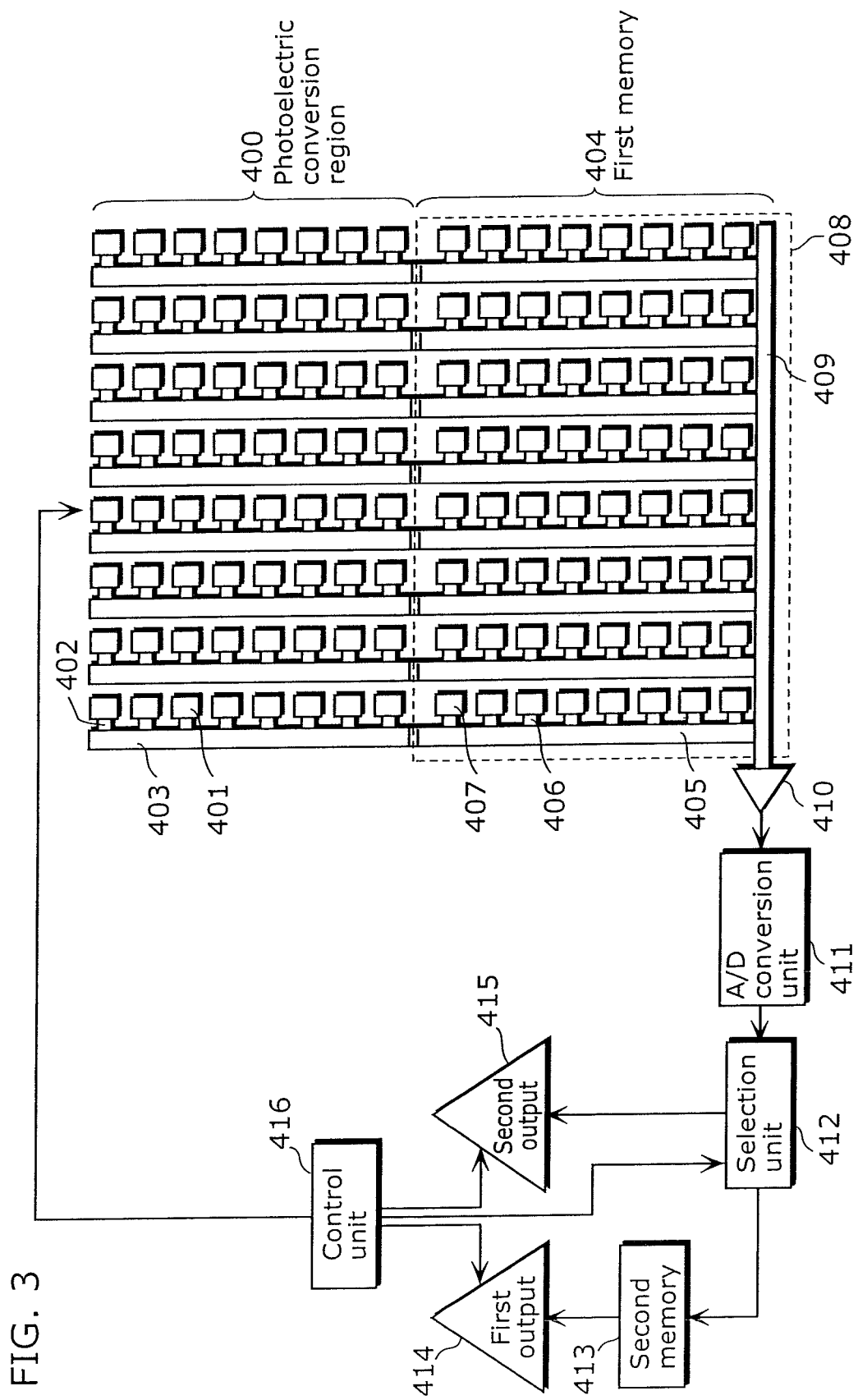
FIG. 3 is a configuration diagram of the solid-state imaging device according to the first embodiment.

FIG. 3 is a configuration diagram of the solid-state imaging device according to the first embodiment. The solid-state imaging device according to the first embodiment includes a photoelectric conversion region (solid-state imaging element) 400, a first memory 404, a horizontal CCD 409, an internal output unit 410, an A/D conversion unit 411, a selection unit 412, a second memory 413, a first output unit 414, a second output unit 415 and a control unit 416. Although not shown in FIG. 3, the solid-state imaging device also includes an electronic shutter.

The photoelectric conversion region 400 is a region having a function of converting incident light to a charge, and includes plural photodiodes 401 arranged in a matrix; vertical CCDs 403, each of which is a charge transfer path in a vertical direction arranged on the left side of a row of the photodiodes 401; and first transfer gates 402, each connecting a corresponding photodiode 401 to a corresponding vertical CCD 403 provided on the left side of the photodiode 401.

Figure 4:
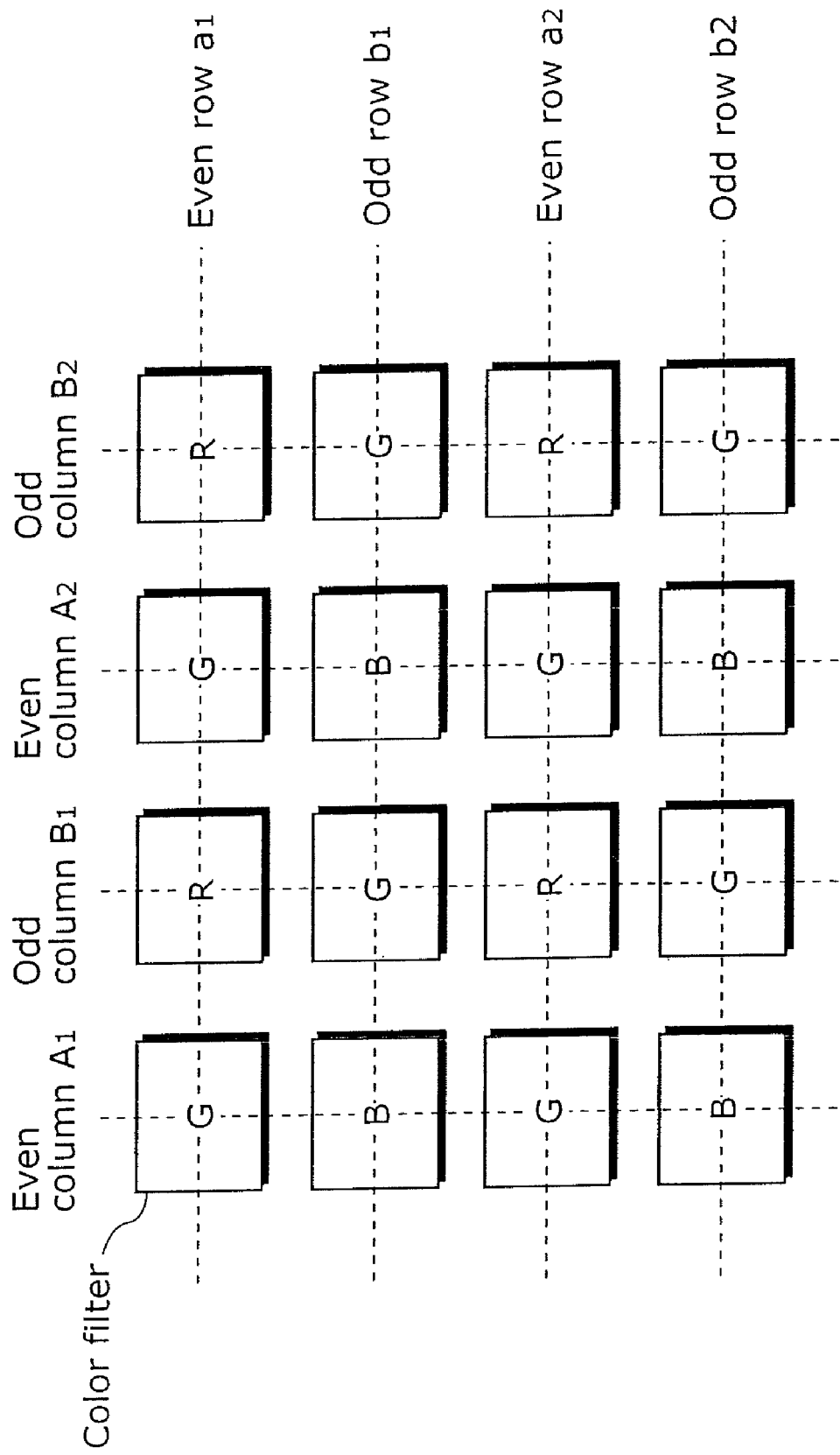
FIG. 4 is a diagram showing arrangement of color filters of the solid-state imaging device according to the first embodiment.

The photoelectric conversion region 400 includes color filters above each of the photodiodes 401. FIG. 4 shows an arrangement of the color filters. In the first embodiment, color filters in green (G) are arranged in the positions at an even column $A_1$, an even column $A_2$ and an even row $a_1$, an even row $a_2$. Color filters in blue (B) are arranged in positions at the even column $A_1$, the even column $A_2$ and an odd row $b_1$ and an odd row $b_2$. Color filters in red (R) are arranged in positions at an odd column $B_1$, an odd column $B_2$ and the even row $a_1$, the even row $a_2$. Furthermore, color filters in green (G) are arranged in positions at the odd column $B_1$, the odd column $B_2$ and the odd row $b_1$ and the odd row $b_2$. As described above, the arrangement of the color filters according to the first embodiment is the Bayer pattern.

The first memory 404 is a region that accumulates charges obtained by the photoelectric conversion region 400 and thereby functions as a memory for the charges. The first memory 404 has plural photodiodes 407 arranged in a matrix; vertical CCDs 405, each of which is a charge transfer path in the vertical direction arranged on the left side of each row of the photodiodes 407; second transfer gates 406, provided on the left side of the respective photodiodes 407, each connecting a photodiode 407 to the corresponding vertical CCD 405; and a light-shielding film 408. As shown in FIG. 3, the number and arrangement form of the photodiodes 407 are the same as those of the photodiodes 401. The vertical CCDs 405 are connected to their corresponding vertical CCDs 403 provided thereabove. The light-shielding film 408 covers all of the photodiodes 407 and thus light does not enter any of the photodiodes 407. That is, the photodiodes 407 each have a photoelectric conversion function but do not use the function; instead, the photodiodes 407 each accumulate a charge transferred thereto and thereby function as a memory.

The horizontal CCD 409 is a charge transfer path in a horizontal direction arranged at lower ends of the vertical CCDs 405, and transfers charges from the vertical CCDs 405, to an internal output unit 410. The internal output unit 410 converts the charges from the horizontal CCD 409, into a voltage value corresponding to the charges. The A/D conversion unit 411 converts the analog voltage value from the internal output unit 410, into a digital value. The selection unit 412 transfers, according to an instruction from the control unit 416, the value converted by the A/D conversion unit 411 to either the second memory 413 or the a second adding unit 415. The second memory 413 holds the data converted by the A/D conversion unit 411. A first output unit 414 outputs the data held in the second memory 413 to outside of the solid-state imaging device. The second output unit 415 outputs the data from the selection unit 412 to outside of the solid-state imaging device. The control unit 416 controls operations of the photoelectric conversion region 400, the first memory 404, the horizontal CCD 409, the internal output unit 410, the A/D conversion unit 411, and the second output unit 415.

Next, the operation of the solid-state imaging device according to the first embodiment will be described.

Figure 5A:
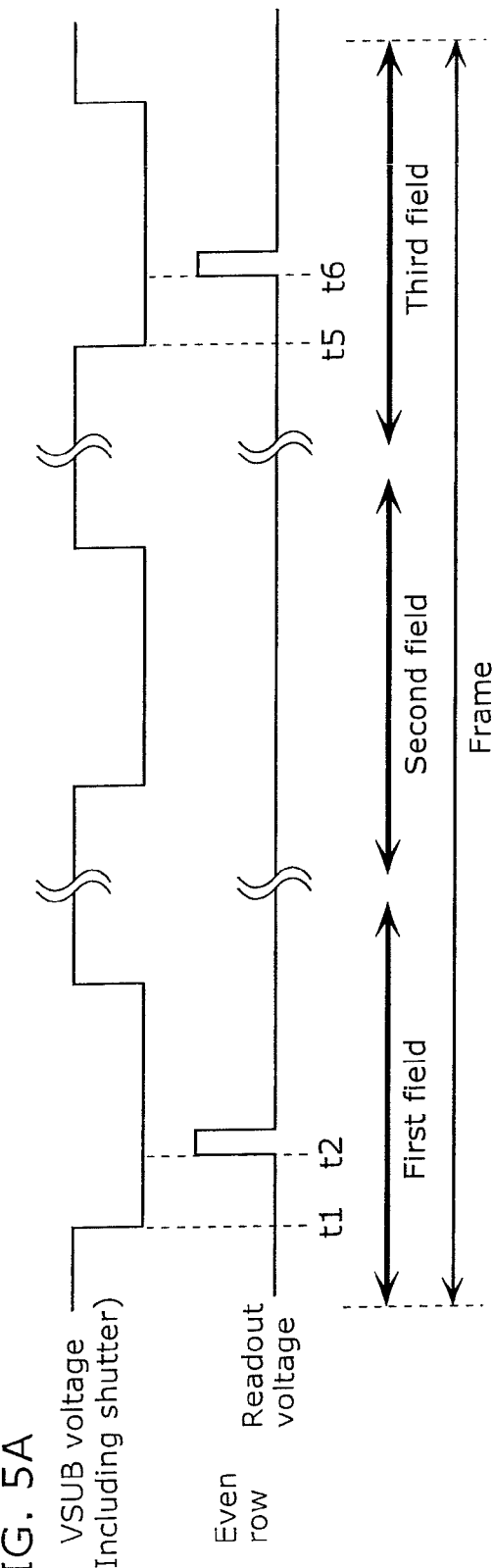
FIG. 5A is a diagram showing pulse waveforms of a VSUB voltage and a read voltage which are for controlling the electronic shutter respectively, in a first field, a second field and a third field which are included in one frame, according to the first embodiment.
Figure 5B:
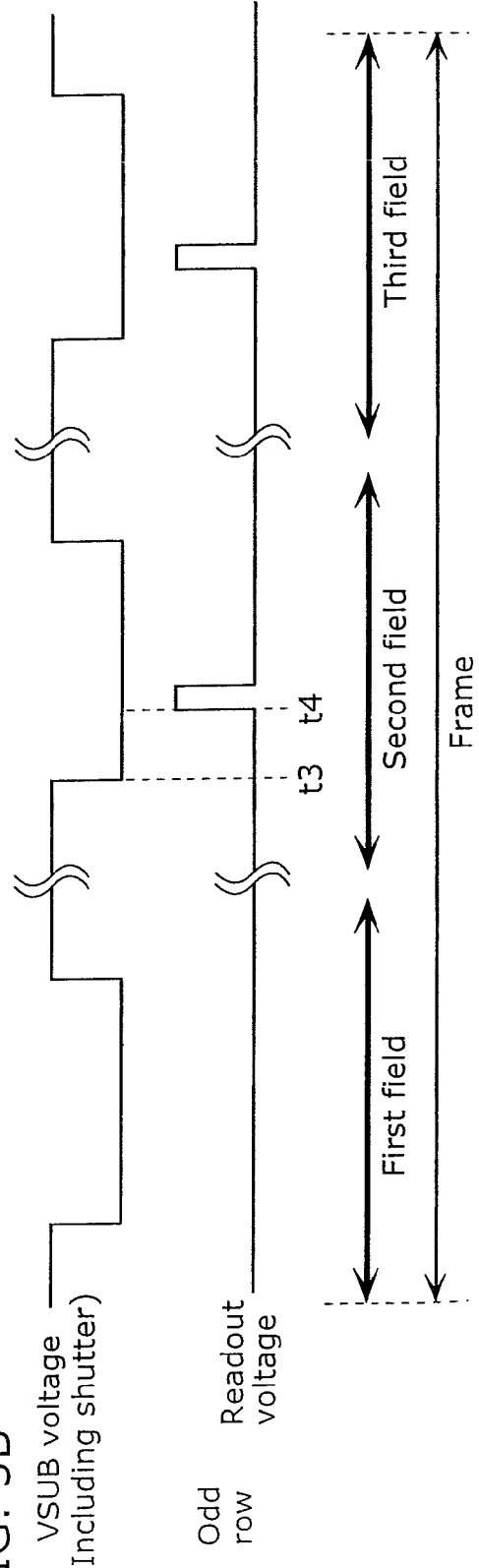
FIG. 5B is a diagram showing pulse waveforms of a VSUB voltage and a read voltage which are for controlling the electronic shutter in a second field which is included in the frame, according to the first embodiment.

In the first embodiment, one frame includes three fields. A charge accumulation period of each field is equal. FIG. 5 A is a diagram showing pulse waveforms of a VSUB voltage and a read voltage which are for controlling the electronic shutter respectively, in a first field and a third field which are included in one frame, according to the first embodiment. FIG. 5 B is a diagram showing pulse waveforms of a VSUB voltage and a read voltage which are for controlling the electronic shutter in a second field which is included in the frame, according to the first embodiment.

It is assumed that, in the field period of the first field, a time at which the electronic shutter starts to stop is t1 and a read start time is t2, in the field period of the second field, a time at which the electronic shutter starts to stop is t3 and a read start time is t4, and in the field period of the third field, a time at which the electronic shutter starts to stop is t5 and a read start time is t6. The time at which the electronic shutter starts to stop is a charge accumulation start time and the read start time is a charge accumulation end time.

In the field periods of the first field and the third field, the charges generated in the photodiodes 401 which are under the filters in the even rows a in each column are read out, and in the field periods of the second field, the charges generated in the photodiodes 401 which are under the filters in the odd rows b in each column are read out.

Here, an average of the charge accumulation start time in the field period of the first field and the charge accumulation start time in the field period of the third field is made to fall within the charge accumulation period of the second field, or an average of the charge accumulation end time in the field period of the first field and the charge accumulation end time in the field period of the third field is made to fall within the charge accumulation period of the second field. These relationships can be represented by the following expressions:

$$t3 <= (t1+t5)/2 <= t4 \text{ or } t3 <= (t2+t6)/2 <= t4.$$

According to these relationships, it is assumed that the total signal charge (second signal charge) of the signal charge accumulated in the field period of the first field and the signal charge accumulated in the field period of the third field is obtained in a time which is close to the time when the signal charge accumulated in the field period of the second field (first signal charge) is obtained.

Figure 6:
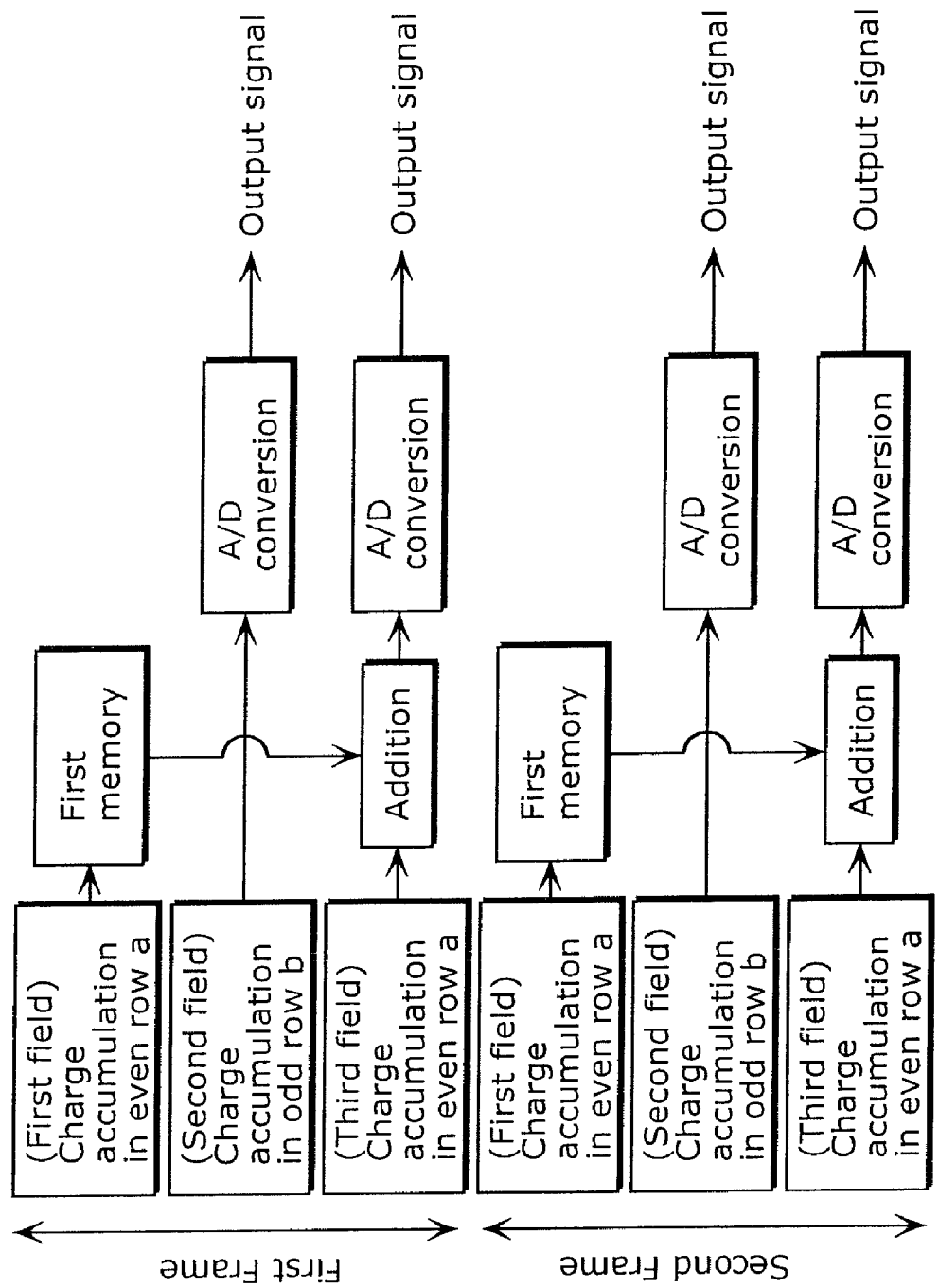
FIG. 6 is a chart showing steps of an operation of the solid-state imaging device according to the first embodiment.

FIG. 6 is a chart showing steps of the operation of the solid-state imaging device according to the first embodiment.

In the field period of the first field, the photodiodes 401 under the filters in the even rows a in each column accumulates the charges corresponding to the amount of incident light during a period between time t1 and t2. The accumulated charges are transferred to the vertical CCDs 403 through the first transfer gates 402 and further transferred to the first memory 404. The photodiodes 407 included in the first memory 404 accumulate the charges transferred from the corresponding photodiodes 401.

In the field period of the second field, the photodiodes 401 under the filters in the odd rows b in each column accumulate the charges corresponding to the amount of incident light during a period between time t3 and t4. The accumulated charges are transferred to the vertical CCDs 403 through the first transfer gates 402, and then transferred to the vertical CCDs 405, further transferred to the horizontal CCD 409, and further transferred to the internal output unit 410. The internal output unit 410 converts the charges from the horizontal CCD 409, into a voltage value corresponding to the charges and outputs the obtained data to the A/D conversion unit 411. The A/D conversion unit 411 converts the value in the data from the horizontal CCD 409, the analog voltage value corresponding to the charges (first signal charge) accumulated in the field period of the second field, into a digital value. The selection unit 412 transfers the data including the value (digital voltage value corresponding to the first signal charge) obtained by the A/D conversion unit 411 to the second memory 413, and the second memory 413 holds data including the digital voltage value corresponding to the first signal charge.

In the field period of the third field, the photodiodes 401 under the filters in the even rows a in each column accumulate the charges corresponding to the amount of incident light during a period between time t5 and t6. The accumulated charges are transferred to the vertical CCDs 403 through the first transfer gates 402 and further transferred to the first memory 404. The vertical CCDs 405 included in the first memory 404 add together the charges held in the photodiodes 407, which are obtained in the field period of the first field and the charges transferred from the corresponding photodiodes 401, so as to obtain a second signal charge. The second signal charge is transferred to the horizontal CCD 409 and thereafter transferred to the internal output unit 410. The internal output unit 410 converts the charge from the horizontal CCD 409 to a voltage value corresponding to the charge, and outputs the obtained data to the A/D conversion unit 411. The A/D conversion unit 411 converts the value in the data from the horizontal CCD 409, the analog voltage value corresponding to the total charges (second signal charge) of the charge accumulated in the field period of the first field and the charge accumulated in the field period of the third field, into a digital value. The selection unit 412 transfers the data including the value obtained in the A/D conversion unit 411 to the second output unit 415, and the second output unit 415 outputs data including the digital voltage value corresponding to the second signal charge to outside of the solid-state imaging device. In addition, the first output unit 414 outputs the data held in the second memory 413 (the data including the digital voltage value corresponding to the first signal charge) to outside of the solid-state imaging device.

Processing of the charges generated in the respective photodiodes 401 under two color filters is specifically described hereafter, focusing on the green (G) color filter arranged in the position at the even column $A_1$ and the even row $a_1$ and the blue (B) color filter arranged in the position at the even column $A_1$ and odd row $b_1$ in FIG. 4.

In the field period of the first field, the photodiode 401 which is under the green (G) color filter accumulates the charge corresponding to the amount of incident light during a period between time t1 and t2. The accumulated charge is transferred to the vertical CCD 403 through the first transfer gates 402 and further transferred to the first memory 404. The photodiode 407 which corresponds to the photodiode 401, in the first memory 404, accumulates the charge transferred from the photodiode 401.

In the field period of the second field, the photodiode 401 which is under the blue (B) color filter accumulates the charge corresponding to the amount of incident light during a period between time t3 and t4. The accumulated charge is transferred to the vertical CCD 403 through the first transfer gates 402, further transferred to the vertical CCD 405, further transferred to the horizontal CCD 409, and further transferred to the internal output unit 410. The internal output unit 410 converts the charge from the horizontal CCD 409 to a voltage value corresponding to the charge, and outputs the obtained data to the A/D conversion unit 411. The A/D conversion unit 411 converts the analog voltage value from the horizontal CCD 409, i.e., the analog voltage value corresponding to the charge (first signal charge) accumulated in the second field, into a digital value. The selection unit 412 transfers the data including the value obtained by the A/D conversion unit 411 to the second memory 413, and the second memory 413 holds data including the digital voltage value corresponding to the charges (first signal charge).

In the field periods of the third field, the photodiode 401 which is under the green (G) color filter accumulates the charge corresponding to the amount of incident light during a period between time t5 and t6. The accumulated charge is transferred to the vertical CCDs 403 through the first transfer gates 402 and further transferred to the first memory 404. The vertical CCDs 405 included in the first memory 404 add the charges held in the photodiodes 407, which are obtained in the field period of the first field and the charge transferred from the corresponding photodiodes 401, so as to obtain a second signal charge. The second signal charge is transferred to the horizontal CCD 409 and thereafter transferred to the internal output unit 410. The internal output unit 410 converts the charge from the horizontal CCD 409 into a voltage value corresponding to the charge. The A/D conversion unit 411 converts the analog voltage value corresponding to the total charge (second signal charge) of the charge accumulated in the field period of the first field and the charge accumulated in the field period of the third field into digital value. The selection unit 412 transfers the data including the value (digital voltage value corresponding to the second signal charge) obtained in the A/D conversion unit 411 to the second output unit 415, and the second output unit 415 outputs data including the digital voltage value corresponding to the second signal charge to outside of the solid-state imaging device. In addition, the first output unit 414 outputs the data held in the second memory 413 (the data including the digital voltage value corresponding to the first signal charge) to outside of the solid-state imaging device.

As described above, in the first embodiment, in each column, for the pixels positioned in even rows, the charges generated in the field periods of the first field and the field periods of the third field are added, and the digital data corresponding to the total charge (second signal charge) is outputted to outside of the solid-state imaging device. On the other hand, for the pixels positioned in odd rows, the charges generated in the field period of the second field (first signal charge) are not added to the charges generated in other field periods, and the digital data corresponding to the first signal charge is outputted to outside the solid-state imaging device. With this, even when one frame includes three fields and the width of the vertical CCD 403 is narrowed down, temporal resolution of an image is not degraded when imaging a moving object.

Note that, in the first embodiment, in each column, for the pixels positioned in the even rows, the charge generated in the field period of the first field and the charge generated in the field period of the third field are added, and the digital data corresponding to the total charge (second signal charge) is outputted to outside of the solid-state imaging device. Meanwhile, for the pixels positioned in the odd rows, the digital data corresponding to the charges generated in the field period of the second field (first signal charge) is outputted to outside of the solid-state imaging device. Thus, for the data value outputted to outside of the solid-state imaging device, the value for the pixels positioned in the even rows is higher than the value for the pixels positioned in the odd rows. Thus, an adjusting device which is provided outside of the solid-state imaging device, adjusts a value for each pixel, for each color, taking the type of color into consideration.

Furthermore, the "even rows" and the "odd rows" in the first embodiment may be replaced. More specifically, in each column, for the pixels positioned in the odd rows, the charges generated in the field period of the first field and the field period of the third field are added, and the data including a value corresponding to the total value (second signal charge) is outputted to outside of the solid-state imaging device. On the other hand, for the pixels positioned in the even row, and the digital data corresponding to the total charge (first signal charge) is outputted to outside of the solid-state imaging device.

Second Embodiment

As described above, in the first embodiment, in each column, for the pixels positioned in the even rows a, the charges generated in the field period of the first field and in the field period of the third field are added, and the digital data corresponding to the total charge (second signal charge) is outputted to outside of the solid-state imaging device. On the other hand, for the pixels positioned in the odd rows b, the charge generated in the field period of the second field (second signal charge) is not added to the charges generated in other field periods, and the digital data corresponding to the second signal charge is outputted to outside of the solid-state imaging device.

Meanwhile, in the second embodiment, for the pixels having the green (G) color filters, the charges generated in the field period of the second field (first signal charge) are not added to the charges generated in other periods, and the digital data corresponding to the first signal charge is outputted to outside of the solid-state imaging device. On the other hand, for the pixels having the red (R) and the blue (B) color filters, the charges generated in the field period of the first field and in the field period of the third field are added, and the digital data corresponding to the total charge (second signal charge) is outputted to outside of the solid-state imaging device.

The control unit 416 controls the photoelectric conversion region 400, the first memory 404, the horizontal CCD 409, the internal output unit 410, the A/D conversion unit 411, the selection unit 412, the second memory 413, the first output unit 414, and the second output unit 415, thereby, for the pixels having the green (G) color filters, the digital data corresponding to the charge generated in the field period of the second field (first signal charge) is outputted outside of the solid-state imaging device, and for the pixels having the red (R) and the blue (B) color filters, the charges generated in the field period of the first field and in the field period of the third field are added, and the digital data corresponding to the total charge (second signal charge) is outputted to outside of the solid-state imaging device.

Figure 7:
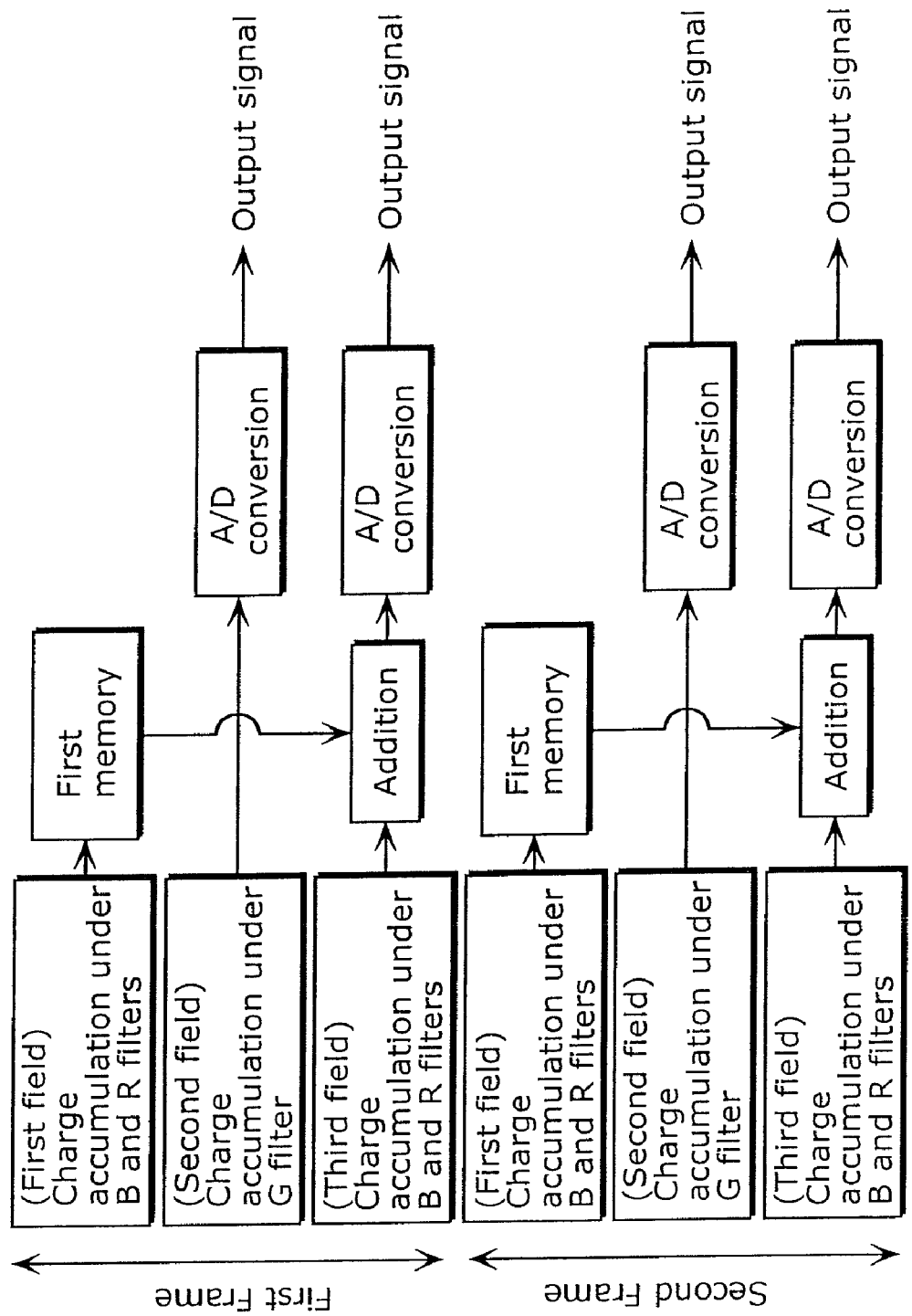
FIG. 7 is a chart showing steps of an operation of the solid-state imaging device according to the second embodiment.

FIG. 7 is a chart showing steps of the operation of the solid-state imaging device according to the second embodiment.

In the field periods of the first field, the photodiodes 401 which are under the red (R) and the blue (B) color filters accumulate charge corresponding to the amount of incident light during a period between time t1 and t2. The accumulated charges are transferred to the vertical CCDs 403 through the first transfer gates 402 and further transferred to the first memory 404. The photodiodes 407 included in the first memory 404 accumulate the charges transferred from the corresponding photodiodes 401.

In the field period of the second field, the photodiode 401 which is under the green (G) color filter accumulates the charge corresponding to the amount of incident light between time t3 and t4. The accumulated charge is transferred to the vertical CCDs 403 through the first transfer gates 402, further transferred to the vertical CCDs 405, further transferred to the horizontal CCD 409, and further transferred to the internal output unit 410. The internal output unit 410 converts the charge from the horizontal CCD 409 to a voltage value corresponding to the charge, and outputs the obtained data to the A/D conversion unit 411. The A/D conversion unit 411 converts the analog voltage value from the horizontal CCD 409, i.e., the analog voltage value corresponding to the charge (first signal charge) accumulated in the field period of the second field, into a digital value. The selection unit 412 transfers the data including the value (digital voltage value corresponding to the first signal charge) obtained by the A/D conversion unit 411 to the second memory 413. The second memory 413 holds data including the digital voltage value corresponding to the first signal charge.

In the field period of the third field, the photodiodes 401 which are under the red (R) and the blue (B) color filters accumulate the charge corresponding to the amount of incident light during a period between time t5 and t6. The accumulated charge is transferred to the vertical CCDs 403 through the first transfer gates 402 and further transferred to the first memory 404. The vertical CCDs 405 included in the first memory 404 add the charge held in the photodiode 407, which is generated in the field period of the first field, and the charge transferred from the corresponding photodiodes 401, so as to obtain the second signal charge. The second signal charge is transferred to the horizontal CCD 409 and thereafter transferred to the internal output unit 410. The internal output unit 410 converts the charge from the horizontal CCD 409 to a voltage value corresponding to the charge, and outputs the obtained data to the A/D conversion unit 411. The A/D conversion unit 411 converts the value in the data from the horizontal CCD 409, the analog voltage value corresponding to the charge (second signal charge) accumulated in the field period of the first field and the field period of the third field, into a digital value. The selection unit 412 transfers the data including the value (the digital voltage value corresponding to the second signal charge) obtained in the A/D conversion unit 411 to the second output unit 415. The second output unit 415 outputs the data from the selection unit 412 (the data including the digital voltage value corresponding to the second signal charge) to outside of the solid-state imaging device. In addition, the first output unit 414 outputs the data held in the second memory 413 (the data including the digital voltage value corresponding to the first signal charge) to outside of the solid-state imaging device.

The operation is specifically described with reference to even column $A_1$ and even column $A_2$ in the arrangement of the color filters shown in FIG. 4. The control unit 416 controls the operation so that digital data corresponding to the charges generated by photoelectric conversion in the photodiodes 401 under the green (G) color filter positioned in the even row $a_1$ and the even row $a_2$ are outputted to outside of the solid-state imaging device. In addition, the control unit 416 controls the operation so that digital data corresponding to the charges generated in the field period of the first field and the field period of the third field, by photoelectric conversion in the photodiodes 401 under the blue (B) color filters positioned at the odd row $b_1$ and the odd row $b_2$ are outputted to outside of the solid-state imaging device.

Figure 8:
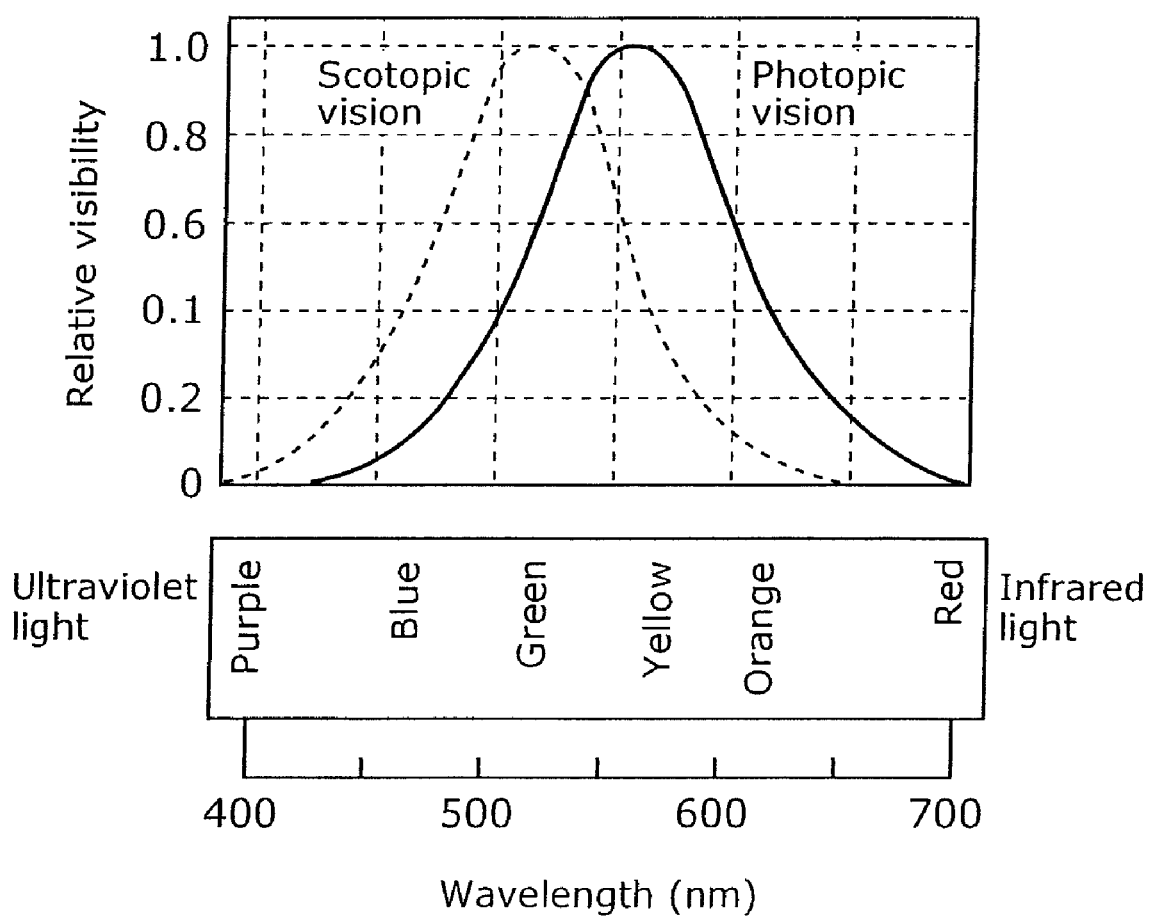
FIG. 8 is a diagram showing relative visibility.

As shown in the relative visibility curve of FIG. 8, the sensitivity of the human eyes for green (G) is better than that of red (R) and blue (B). The charge accumulated in the field period of the first field and the charge accumulated in the field period of the third field are accumulated at different times even though the charges are accumulated for the same accumulation period and thus the amount of the charges rarely match completely when imaging a moving object. That is, an image obtained in the third period looks blurred from an image obtained in the first field. In addition, the charge accumulated in the field period of the second field is not added to the charge accumulated in other field periods. Thus, an image obtained in the second field does not look blurred.

As described above, the sensitivity of the human eyes to color varies from color to color. When a color of high color sensitivity to human eyes is in the first field and the third field, an image blur is more strongly perceived in human eyes. On the contrary, when a color of low color sensitivity to human eyes is in the first field and the third field, the image blur is less likely to be perceived in human eyes. Thus, taking the sensitivity of human eyes to color (wavelength of light) into consideration, it is preferable that the signal charge under the green (G) color filter, the color of high color sensitivity to human eyes is obtained in the field period of the second field. This can be achieved by the solid-state imaging device according to the second embodiment. More specifically, it is possible for the solid-state imaging device according to the second embodiment to process charges in such a manner that an image blur is less likely to be perceived in human eyes while taking the sensitivity of human eyes to color into consideration. Note that, the relative visibility curve of FIG. 8 is disclosed in page 56 of "Biological Information System Theory", by Tadahiko Fukuda, published by Sangyo Tosho.

Third Embodiment

Next, a configuration of a solid-state imaging device according to a third embodiment will be described.

Figure 9:
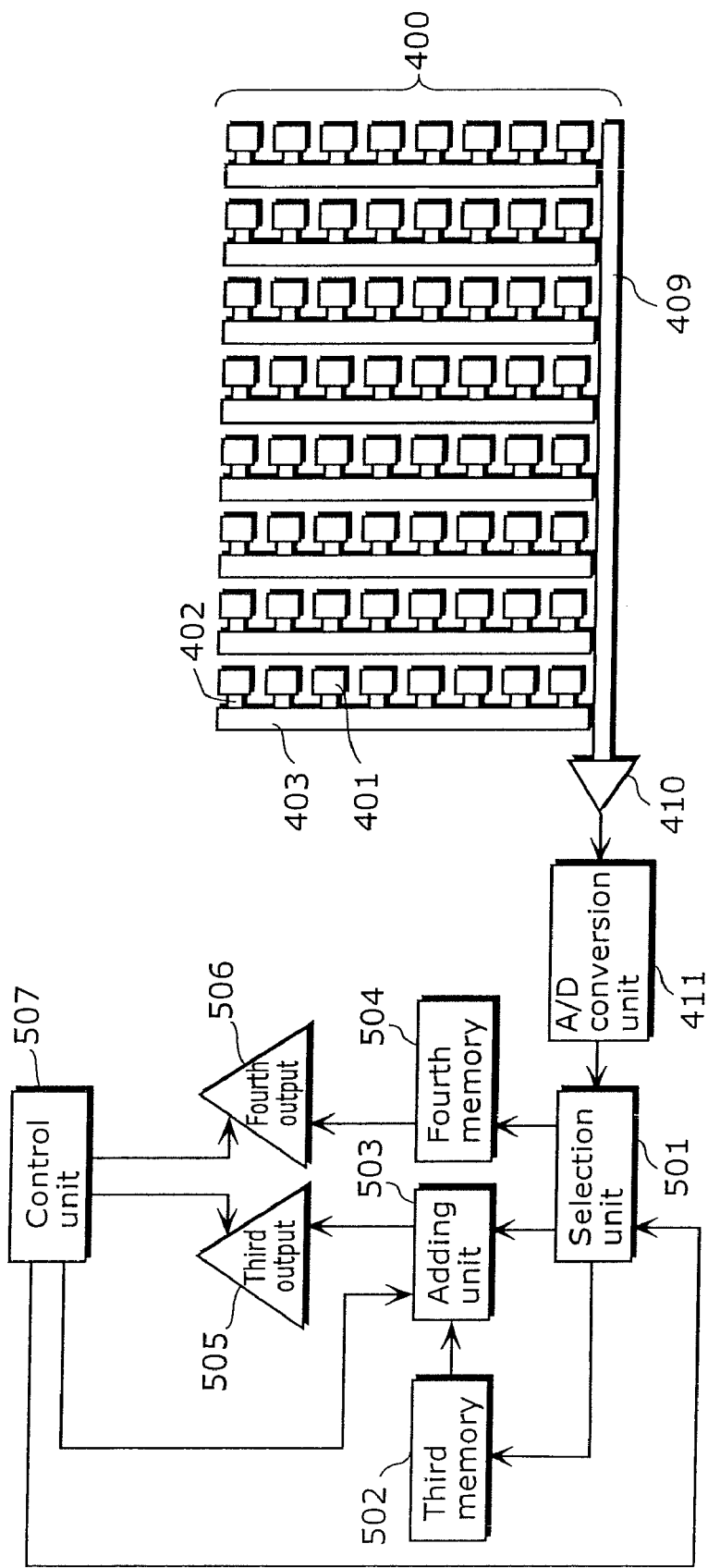
FIG. 9 is a configuration diagram of the solid-state imaging device according to the third embodiment.

FIG. 9 is a configuration diagram of the solid-state imaging is device according to the third embodiment. The solid-state imaging device according to the third embodiment includes a photoelectric conversion region (solid-state imaging element) 400, a horizontal CCD 409, an internal output unit 410, an A/D conversion unit 411, a selection unit 501, a third memory 502, an adding unit 503, a fourth memory 504, a third output unit 505, a fourth output unit 506, and a control unit 507. Although not shown in FIG. 9, the solid-state imaging device also includes an electric shutter.

Descriptions of the photoelectric conversion region 400, the horizontal CCD 409, the internal output unit 410, and the A/D conversion unit 411 are omitted since the descriptions of the components have already been made in the first embodiment. Note that the vertical CCDs 403 included in the photoelectric conversion region 400 are directly connected to the horizontal CCD 409, and the horizontal CCD 409 transfers the charges from each of the vertical CCDs 403 to the internal output unit 410.

The selection unit 501 transfers, according to an instruction from the control unit 507, the value converted by the A/D conversion unit 411 to the third memory 502, the adding unit 503, or the fourth memory 504. The third memory 502 and the fourth memory 504 holds the data converted by the A/D conversion unit 411. The adding unit 503 adds the data held in the third memory 502 and the data from the selection unit 501. The third output unit 505 outputs data obtained by the adding unit 503 to outside of the solid-state imaging device. The fourth output unit 506 outputs the data held in the fourth memory 504 to outside of the solid-state imaging device. The control unit 507 controls the operations of the selection unit 501, the adding unit 503, the third output unit 505, and the fourth output unit 506.

Figure 10:
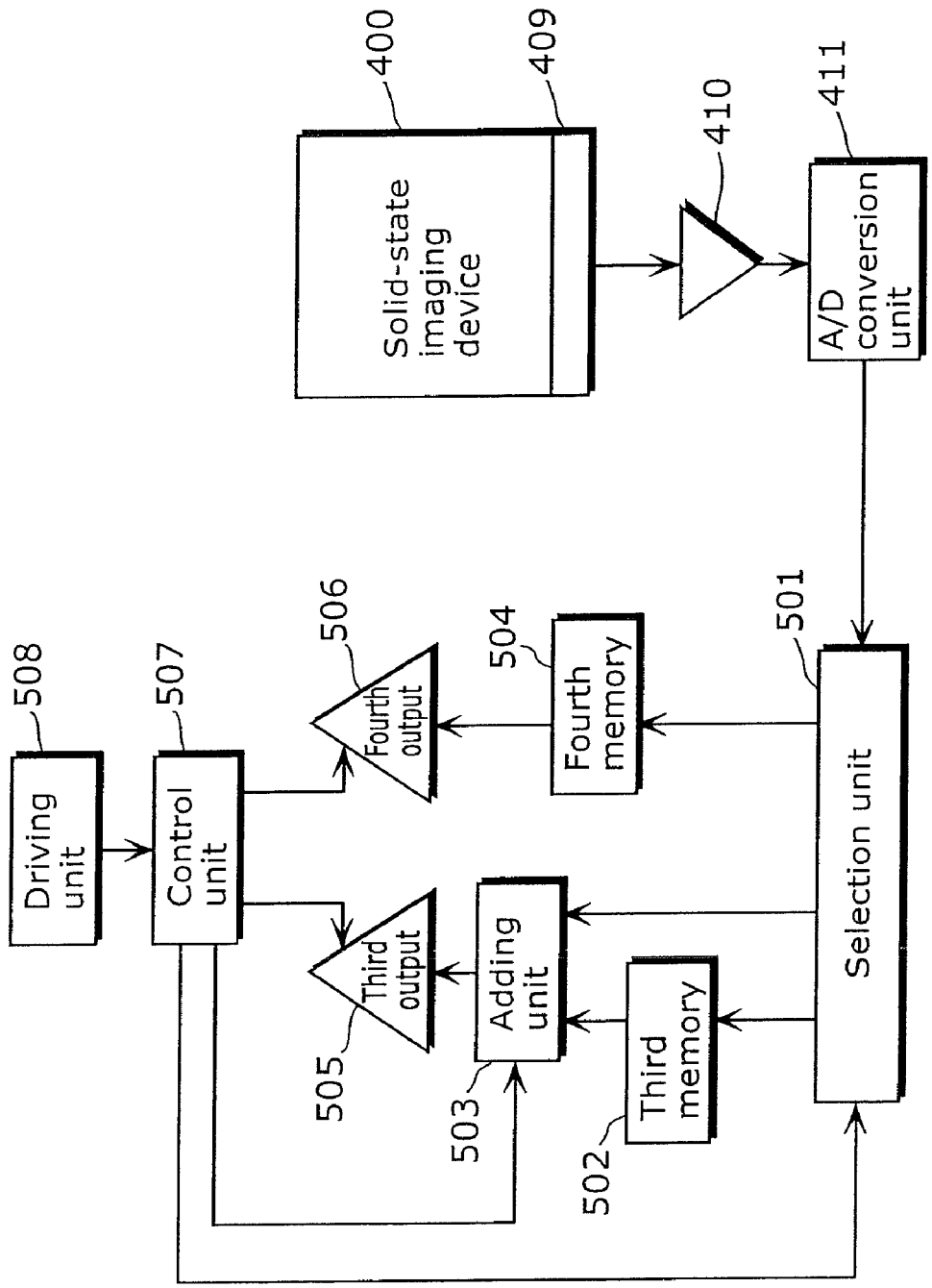
FIG. 10 is a block diagram of the solid-state imaging device according to the third embodiment.

FIG. 10 is a block diagram of the solid-state imaging device according to the third embodiment. In FIG. 10, a driving unit 508 is added to the components shown in FIG. 9. The driving unit 508 drives the control unit 507 based on a drive signal from outside of the solid-state imaging device.

Next, the operation of the solid-state imaging device according to the third embodiment will be described.

In the third embodiment, one frame includes two fields. Charge accumulation periods of the respective fields are equal. FIG. 11 A is a diagram showing pulse waveforms of a VSUB voltage and a read voltage which are for controlling the electronic shutter respectively, in a first field which is included in one frame, according to the third embodiment. FIG. 11 B is a diagram showing pulse waveforms of a VSUB voltage and a read voltage which are for controlling the electronic shutter in a second field which is included in the frame, according to the third embodiment;

It is assumed that, in the field period of the first field of the first frame, a time at which the electronic shutter starts to stop is t1 and a read start time is t2, in the field period of the second field of the first frame, a time at which the electronic shutter starts to stop is t3 and a read start time is t4, and in the field period of the first field of the second frame, a time at which the electronic shutter starts to stop is t5 and a read start time is t6. The time at which the electronic shutter starts to stop is a charge accumulation start time and the read start time is a charge accumulation end time.

In the field period of the first field of the first frame and the field period of the first field of the second frame, the charges generated in the photodiodes 401 which are under the red (R) and the blue (B) color filters are read out, and in the field period of the second field of the first frame, the charges generated in the photodiodes 401 which are under the green (G) color filters are read out.

In addition, an average of the charge accumulation start time in the field period of the first field of the first frame and the charge accumulation start time in the field period of the first field of the second field falls within the charge accumulation period of the field period of the second field of the first frame, or an average of the charge accumulation end time in the field period of the first field of the first frame and the charge accumulation end time in the field period of the first field of the second frame falls within the charge accumulation period of the field period of the second field of the first frame. These relationships can be represented by the following expressions:

$$t3<=(t1+t5)/2=t4 \text{ or } t3<=(t2+t6)/2<=t4.$$

According to these relationships, it is assumed that the total signal charge (second signal charge) of the signal charge accumulated in the field period of the first field of the first frame and the signal charge accumulated in the field period of the first field of the second frame is obtained in a time which is close to the time when the signal charge (first signal charge) accumulated in the second field of the first frame is obtained.

Figure 12:
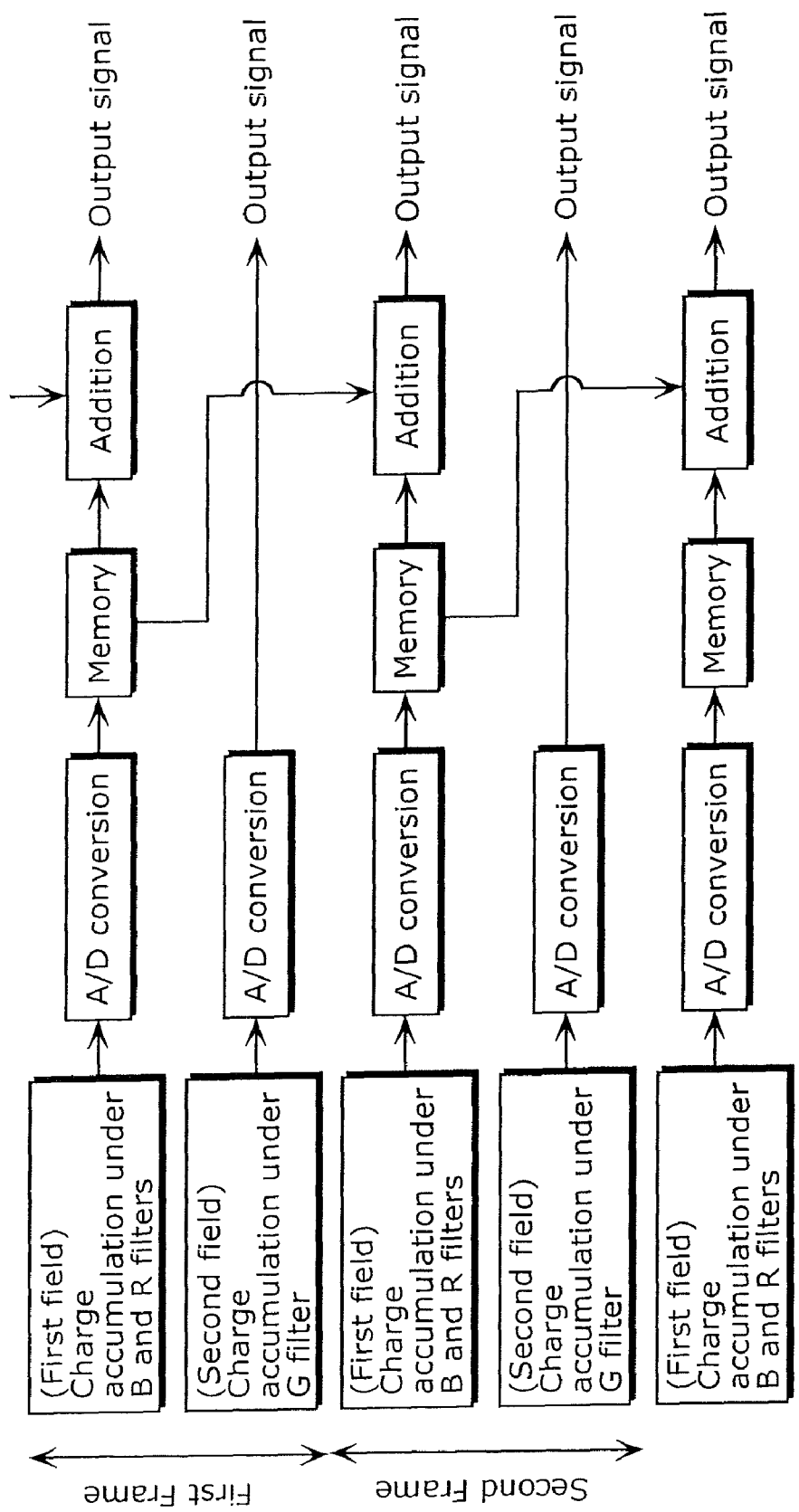
FIG. 12 is a chart showing steps of an operation of the solid-state imaging device according to the third embodiment.

FIG. 12 is a chart showing steps of the operation of the solid-state imaging device according to the third embodiment.

In the field period of the first field of the first frame, the photodiodes 401 which are under the red (R) and the blue (B) color filters accumulate the charge corresponding to the amount of incident light during a period between time t1 and t2. The accumulated charges are transferred to the vertical CCDs 403 through the first transfer gates 402, and then transferred to the vertical CCDs 403, further transferred to the horizontal CCD 409, and further transferred to the internal output unit 410. The internal output unit 410 converts the charge from the horizontal CCD 409, into a voltage value corresponding to the charge and outputs the obtained data to the A/D conversion unit 411. The A/D conversion unit 411 converts the value in the data from the horizontal CCD 409, the analog voltage value corresponding to the charges accumulated in the field period of the first field of the first frame into a digital value. The selection unit 501 transfers the data including the value obtained by the A/D conversion unit 411 to the third memory 502. The third memory 502 holds the data, in the first field of the first frame, including a digital voltage value corresponding to the signal charges generated in the photodiodes 401 under the red (R) and the blue (B) color filters.

In the field period of the second field of the first frame, the photodiodes 401 which are under the green (G) color filters accumulate the charge corresponding to the amount of incident light during a period between time t3 and t4. The accumulated charges are transferred to the vertical CCDs 403 through the first transfer gates 402, further transferred to the horizontal CCD 409, and further transferred to the internal output unit 410. The internal output unit 410 converts the charges from the horizontal CCD 409, into a voltage value corresponding to the charges and outputs the obtained data to the A/D conversion unit 411. The A/D conversion unit 411 converts the value in the data from the horizontal CCD 409, the analog voltage value corresponding to the charges (first signal charge) accumulated in the field period of the second field of the first frame, into a digital value. The selection unit 501 transfers data including the value (digital voltage value corresponding to the first signal charge) obtained by the A/D conversion unit 411 to the fourth memory 504. The fourth memory 504 holds the data including a digital voltage value corresponding to the signal charges generated in the photodiodes 401 under the green (G) color filters in the field period of the second field of the first frame.

In the field period of the first field of the second frame, the photodiodes 401 which are under the red (R) and the blue (B) color filters accumulate the charge corresponding to the amount of incident light during a period between time t5 and t6. The accumulated charges are transferred to the vertical CCDs 403 through the first transfer gates 402, further transferred to the horizontal CCD 409, and further transferred to the internal output unit 410. The internal output unit 410 converts the charge from the horizontal CCD 409, into a voltage value corresponding to the charge and outputs the obtained data to the A/D conversion unit 411. The A/D conversion unit 411 converts the value in the data from the horizontal CCD 409, the analog voltage value corresponding to the charges accumulated in the first field of the second frame into a digital value.

The selection unit 501 transfers the data including the value obtained by the A/D conversion unit 411 to the adding unit 503. The adding unit 503 adds the data held in the third memory 502 and the data from the selection unit 501. More specifically, the adding unit 503 obtains the data including the digital voltage value corresponding to the second signal charge by adding the data including the digital voltage value corresponding to the signal charges obtained by the photodiodes 401 under the red (R) and the blue (B) color filters in the field period of the first field of the first frame, and the data including the digital voltage value corresponding to the signal charge obtained by the photodiodes 401 under the red (R) and the blue (B) color filters in the field period of the first field of the second frame.

Subsequently, the third output unit 505 outputs the data (the data including the digital voltage value corresponding to the second signal charge) obtained by the adding unit 503 to outside of the solid-state imaging device, and the fourth output unit 506 outputs the data (the data including the digital voltage value corresponding to the first signal charge) held in the fourth memory 504 to outside of the solid-state imaging device.

As described above, in the third embodiment, for the pixels having the red (R) and the blue (B) color filters, the charges generated in the field period of the first period and the field period of the third field are added, and the digital data corresponding to the total charge (second signal charge) is outputted to outside of the solid-state imaging device. On the other hand, for the pixels having the green (G) color filters, the charges generated in the field period of the second field are not added to the charges obtained in the other periods, and the digital data corresponding to the first signal charge is outputted to outside of the solid-state imaging device. With this, even when one frame includes two fields and the width of the vertical CCD 403 is narrowed down in order to suppress increase of smear, temporal resolution of an image is not degraded when imaging a moving object.

In addition, in the field period of the second field of the first frame in which charge generated in the pixels under green (G) filters are not added. Note that green is a color in which the sensitivity of the human eyes to color is its highest. Therefore, an image blur is less likely to be perceived in human eyes.

Furthermore, in the first and second embodiments, one frame includes three fields. Meanwhile, in the third embodiment, one frame includes two fields. Thus, the operation described in the third embodiment can be realized in the operation of the regular frame mode. Therefore, this facilitates configurations of the control unit 507 and the driving unit 508, and thus in the third embodiment, it is possible to achieve faster operations than in the first and second embodiments.

Note that, in the third embodiment, in the field period of the second field of the first frame, the photodiodes 401 under the green (G) color filters accumulate the charge corresponding to the amount of incident light during a period between time t3 and t4. However, in the field period of the second field of the first frame, the photodiodes 401 under the filters in the even rows a in each column may accumulate the charge corresponding to the amount of incident light. In this case, in the field period of the first field of the first frame and the field period of the first field of the second frame, the photodiodes 401 under the filters in the odd rows b in each column accumulate the charge corresponding to the amount of incident light. Alternatively, in the field period of the second field of the first frame, the photodiodes 401 under the filters in the odd rows b in each column may accumulate the charge corresponding to the amount of incident light. In this case, in the field period of the first field of the first frame and the field period of the first field of the second frame, the photodiodes 401 under the filters in the even rows a in each column may accumulate the charge corresponding to the amount of incident light.

In summary, in each column, the photodiodes 401 positioned under one of two adjacent filters have only to accumulate the charges corresponding to the amount of incident light in the field period of the first field of the first frame and the field period of the second field of the first frame, and the charges are added. The photodiode 401 positioned under the other filter of the two filters, have only to accumulate the charge corresponding to the amount of incident light in the field period of the second field of the first frame.

Fourth Embodiment

Next, a configuration of a solid-state imaging device according to a fourth embodiment will be described.

The configuration of the solid-state imaging device according to the fourth embodiment is the same as that of the first embodiment except for the color filters.

Figure 13:
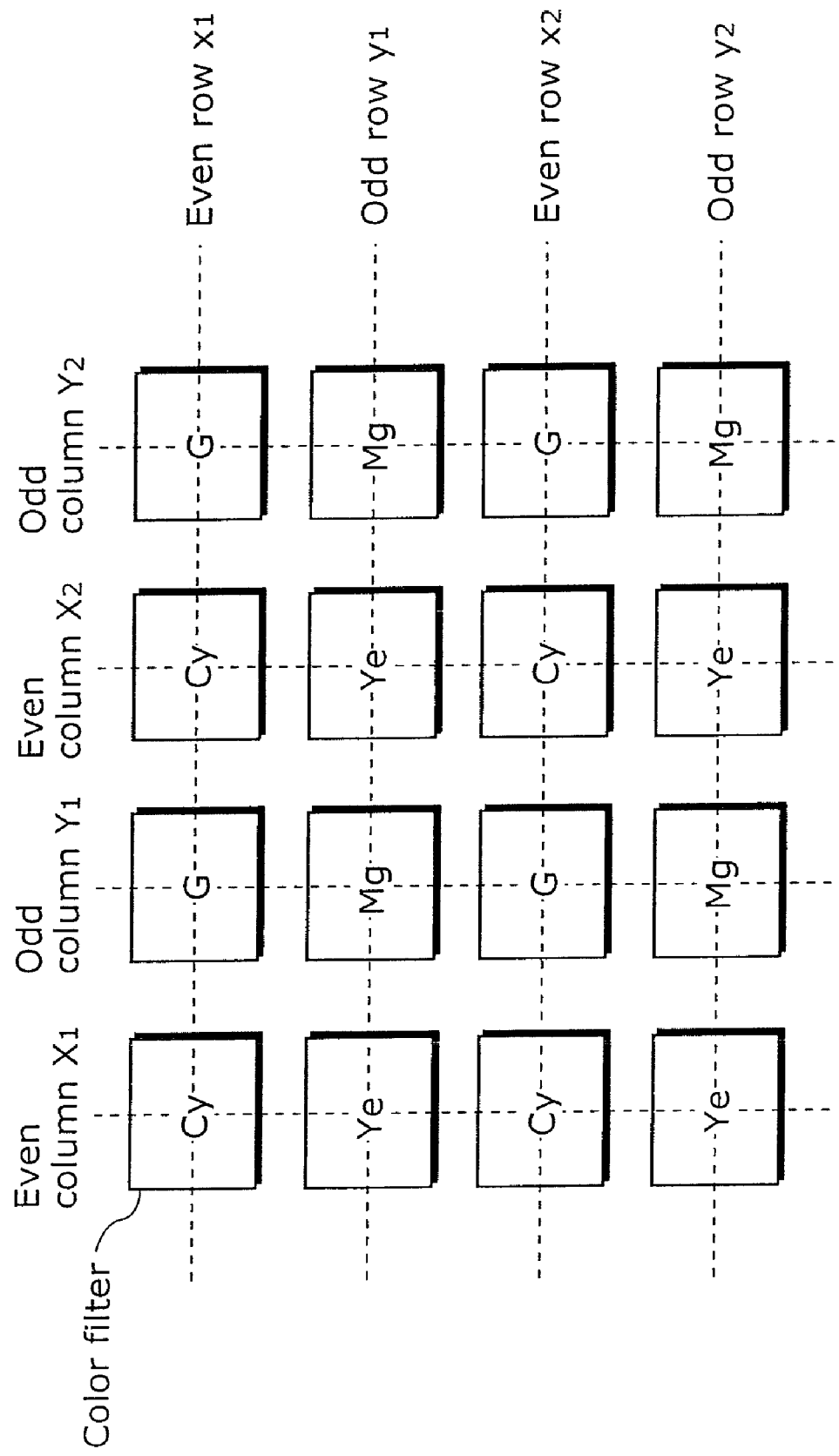
FIG. 13 is a diagram showing an arrangement of color filters in the solid-state imaging device according to the fourth embodiment.

FIG. 13 is a diagram showing an arrangement of color filters in the solid-state imaging device according to the fourth embodiment. In the fourth embodiment, color filters in cyan (Cy) are arranged in positions at the even column $X_1$, the even column $X_2$ and the even row $x_1$, the even row $x_2$. Color filters in yellow (Y) are arranged in positions at the even column $X_1$, the even column $X_2$ and the odd row $y_1$, the odd row $y_2$. Color filters in green (G) are arranged in positions at the odd column $Y_1$, the odd column $Y_2$ and the even row $x_1$, the even row $x_2$. Furthermore, color filters in magenta (Mg) are arranged in positions at the odd column $Y_1$, the odd column $Y_2$ and the odd row $y_1$, the odd row $y_2$. As described above, the arrangement of the color filters according to the fourth embodiment is the Bayer pattern.

Next, an operation of the solid-state imaging device according to the fourth embodiment will be described.

Figure 14A:
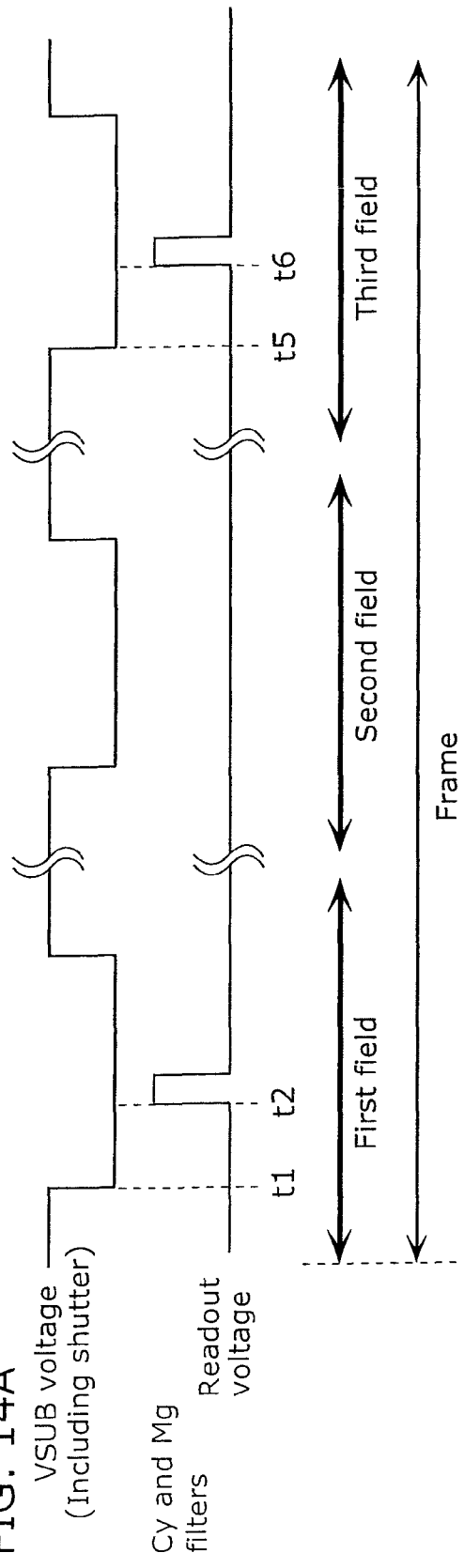
FIG. 14 A is a diagram showing pulse waveforms of a VSUB voltage and a read voltage which are for controlling the electronic shutter respectively, in a first field and a third field which are included in one frame, according to the fourth embodiment.
Figure 14B:
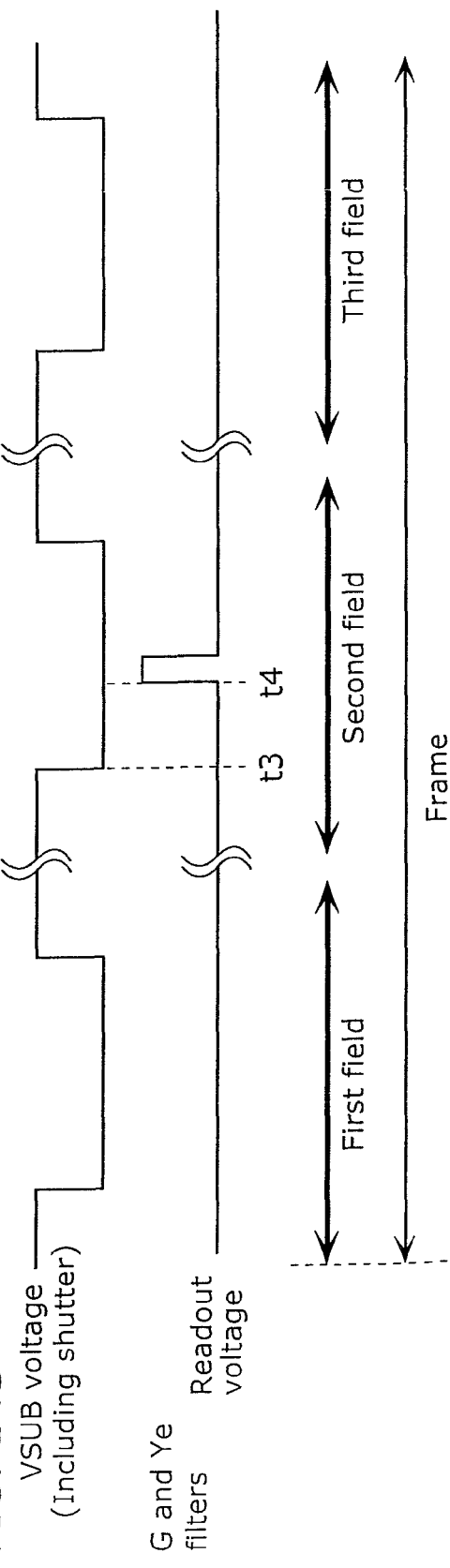

In the fourth embodiment, one frame includes three fields. A charge accumulation period of each field is equal. FIG. 14 A is a diagram showing pulse waveforms of a VSUB voltage and a read voltage which are for controlling the electronic shutter respectively, in a first field and a third field which are included in one frame, according to the fourth embodiment. FIG. 14 B is a diagram showing pulse waveforms of a VSUB voltage and a read voltage which are for controlling the electronic shutter in a second field which is included in the frame, according to the fourth embodiment.

It is assumed that, in the field period of the first field, a time at which the electronic shutter starts to stop is t1 and a read start time is t2, in the field period of the second field, a time at which the electronic shutter starts to stop is t3 and a read start time is t4, and in the field period of the third field, a time at which the electronic shutter starts to stop is t5 and a read start time is t6. The time at which the electronic shutter starts to stop is a charge accumulation start time and the read start time is a charge accumulation end time.

In the field period of the first field and in the field period of the third field, the charges generated in the photodiodes 401 which are under the cyan (Cy) and the magenta (Mg) color filters are read out, and in the field period of the second field, the charges generated in the photodiodes 401 which are under the yellow (Ye) and the green (G) color filters are read out.

Here, an average of the charge accumulation start time in the field period of the first field and the charge accumulation start time in the field period of the third field falls within the charge accumulation period of the second field, or an average of the charge accumulation end time in the field period of the first field and the charge accumulation end time in the field period of the third field falls within the charge accumulation period of the second field. These relationships can be represented by the following expression:

$$t3<=(t1+t5)/2<=t4 \text{ or } t3<=(t2+t6)/2<=t4.$$

According to these relationships, it is assumed that the total signal charge (second signal charge) of the signal charge accumulated in the field period of the first field and the signal charge accumulated in the field period of the third field is obtained in a time which is close to the time when the signal charge (first signal charge) accumulated in the field period of the second field is generated.

Figure 15:
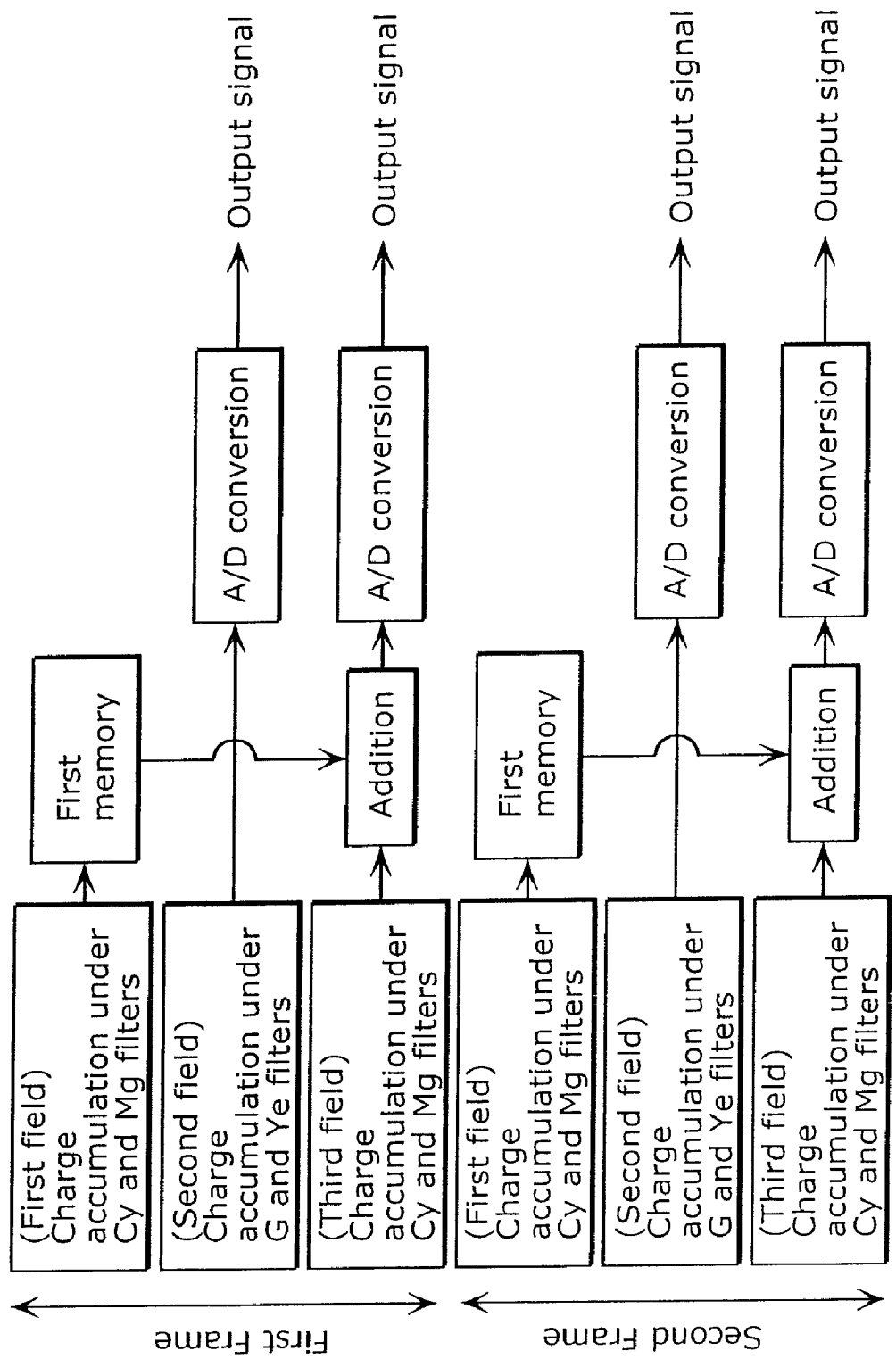
FIG. 15 is a chart showing steps of an operation of the solid-state imaging device according to the fourth embodiment.

FIG. 15 is a chart showing steps of the operation of the solid-state imaging device according to the fourth embodiment.

In the field period of the first field, the photodiodes 401 under the cyan (Cy) and the magenta (Mg) color filters accumulate charge corresponding to the amount of incident light during a period between time t1 and t2. The accumulated charge is transferred to the vertical CCDs 403 through the first transfer gates 402 and further transferred to the first memory 404. The photodiodes 407 included in the first memory 404 accumulate the charges transferred from the corresponding photodiodes 401.

In the field period of the second field, the photodiodes 401 under the yellow (Ye) and the green (G) color filters accumulate the charge corresponding to the amount of incident light during a period between time t3 and t4. The accumulated charge is transferred to the vertical CCDs 403 through the first transfer gates 402, further transferred to the vertical CCDs 405, further transferred to the horizontal CCD 409, and thereafter transferred to the internal output unit 410. The internal output unit 410 converts the charge from the horizontal CCD 409, into a voltage value corresponding to the charge and outputs the obtained data to the A/D conversion unit 411. The A/D conversion unit 411 converts the value in the data from the horizontal CCD 409, the analog voltage value corresponding to the charge (first signal charge) accumulated in the field period of the second field, into a digital value. The selection unit 412 transfers the data including the value (the digital voltage value corresponding to the first signal charge) obtained by the A/D conversion unit 411, to the second memory 413. The second memory 413 holds the data including the digital voltage value corresponding to the first signal charge.

In the field period of the third field, the photodiodes 401 under the cyan (Cy) and the magenta (Mg) color filters accumulate charge corresponding to the amount of incident light during a period between time t5 and t6. The accumulated charge is transferred to the vertical CCDs 403 through the first transfer gates 402 and further transferred to the first memory 404. The vertical CCDs 405 included in the first memory 404 add together the charge generated in the field period of the first field and the charge transferred from the corresponding photodiodes 401, so as to obtain a second signal charge. The second signal charge is transferred to the horizontal CCD 409 and thereafter transferred to the internal output unit 410. The internal output unit 410 converts the charge from the horizontal CCD 409, into a voltage value corresponding to the charge and outputs the obtained data to the A/D conversion unit 411. The A/D conversion unit 411 converts the value in the data from the horizontal CCD 409, the analog voltage value corresponding to the total charge (second signal charge) of the charges accumulated in the field period of the first field and in the field period of the third field, into a digital value. The selection unit 412 transfers the data including the value (the digital voltage value corresponding to the second signal charge) obtained by the A/D conversion unit 411 to the second output unit 415. The second output unit 415 outputs the data (the data including the digital voltage value corresponding to the second signal charge) from the selection unit 412 to outside of the solid-state imaging device. In addition, the first output unit 414 outputs the data (the data including the digital voltage value corresponding to the first signal charge) held in the second memory 413 to outside of the solid-state imaging device.

As described above, in the fourth embodiment, for the pixels of cyan (Cy) and magenta (Mg), the charges generated in the field period of the first field and in the field period of the third field are added together, and the digital data corresponding to the total charge (second signal charge) is outputted to outside of the solid-state imaging device. On the other hand, for the pixels of yellow (Ye) and green (G), the charges generated only in the field period of the second field (first signal charge) are not added to the charges generated in other field periods, and the digital data corresponding to the first signal charge is outputted to outside the solid-state imaging device. With this, even when one frame includes three fields and the width of the vertical CCD 403 is narrowed down in order to suppress increase of smear, temporal resolution of an image is not degraded.

Furthermore, in the fourth embodiment, in the field period of the second field, the charges for the pixels of green (G) color filters are accumulated, and the charge is not added to any other charge. Therefore, as is obvious from the relative visibility curve shown in FIG. 8, flicker of an image is less likely to be perceived in human eyes.

In addition, in the embodiments described above, the cases where one frame includes two or three fields are described. However, one frame may include four or more fields. In such a case, for each row, for one of two adjacent pixels, charge is accumulated in a field period of a predetermined field out of the four fields, and the charge is outputted to outside of the solid-state imaging device as the first signal charge. For the other pixel out of the two adjacent pixels, charges are respectively accumulated in two field periods which are at a temporally equal distance from the predetermined field out of the four fields. The charges are added to obtain the second signal charge, and the second signal charge is outputted to outside of the solid-state imaging device as the first signal charge.

As used in the claims, the term "signal charge" represents "a signal charge" itself or "a value such as an analog or digital voltage value corresponding to a signal charge".

(Modification)

In the first embodiment, one frame includes three fields. Further, a charge accumulation period of each field is equal in time. More specifically, a period (referred to as a "first accumulation period") during which charges are accumulated in the field period of the first field is equal to a period (referred to as a "second accumulation period") during which charges are accumulated in the field period of the second field, and a period (referred to as a "third period") during which charges are accumulated in the field period of the third field.

In the first embodiment, the case where a period (referred to as a "first period") from the first accumulation period to the second accumulation period is equal to a period (referred to as a "second period") from the second accumulation period to the third accumulation period is described. However, it is also possible that the first period is not equal to the second period. As a modification of the first embodiment, a driving method for a solid-state imaging device for the case where the first period is not equal to the second period will be described below.

The description of the configuration of the solid-state imaging device according to the modification is omitted since the configuration is the same as that of the first embodiment (FIG. 3) and the color filters according to the first embodiment (FIG. 4).

Next, the operation of the solid-state imaging device according to the modification will be described.

In the modification, one frame includes three fields. A charge accumulation period of each field is equal in time. However, the length of the first period is not equal to that of the second period.

Figure 16A:
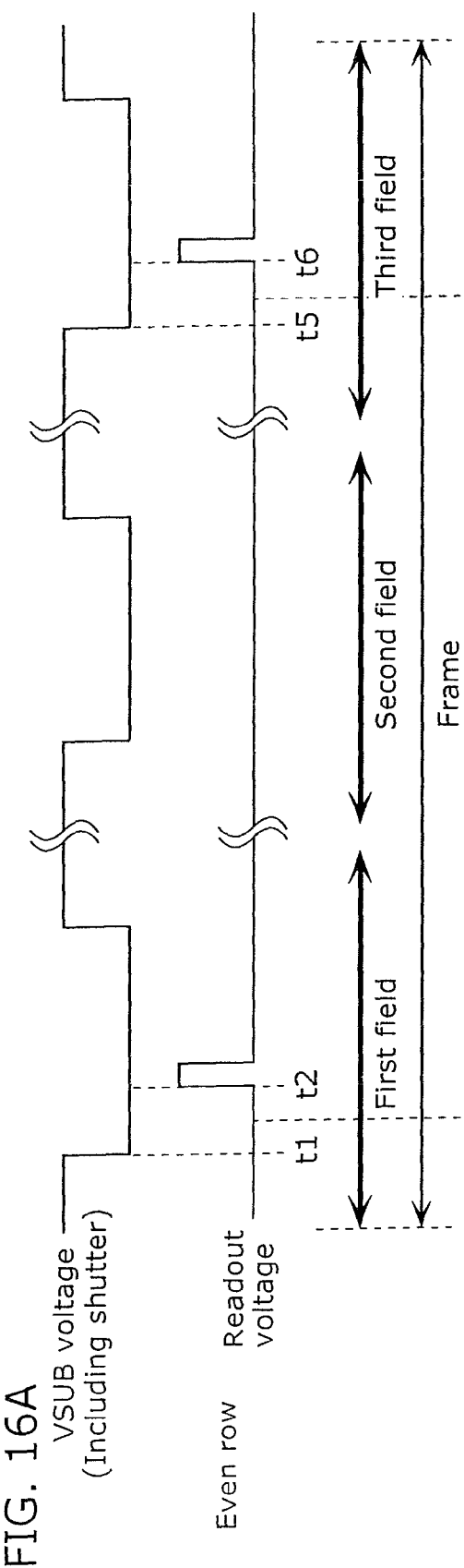
FIG. 16 A is a diagram showing pulse waveforms of a VSUB voltage and a read voltage in a first field and a third field which are included in one frame, according to a modification of the embodiment.
Figure 16B:
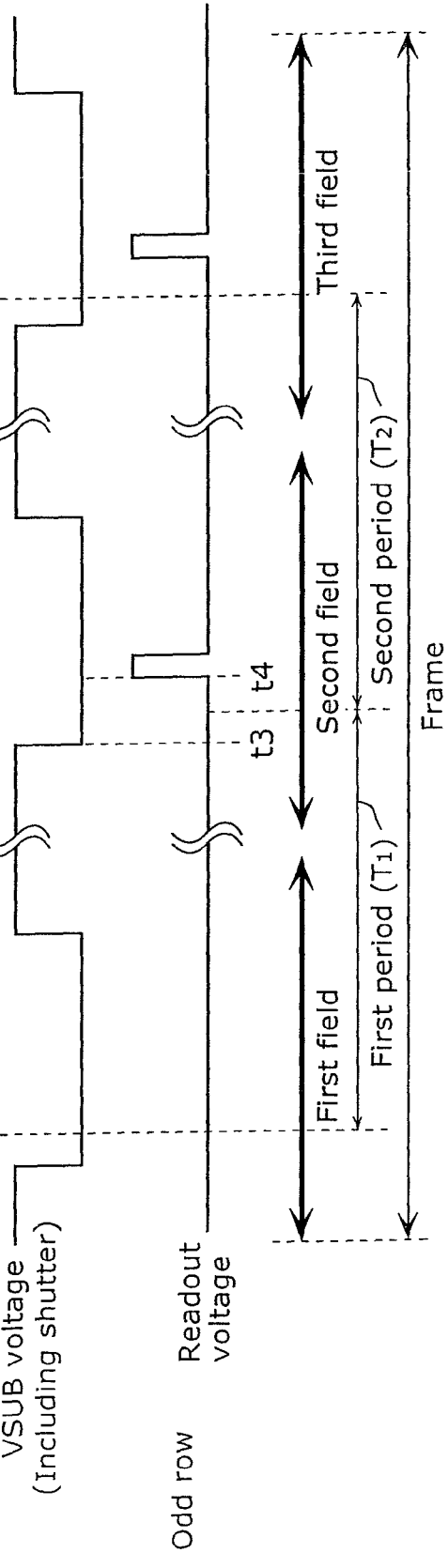

FIG. 16 A is a diagram showing pulse waveforms of a VSUB voltage and a read voltage in a first field and a third field which are included in one frame, according to a modification of the embodiment. FIG. 16 B is a diagram showing pulse waveforms of a VSUB voltage and a read voltage in a second field which is included in the frame, according to a modification of the embodiment.

It is assumed that, in the field period of the first field, a time at which the electronic shutter starts to stop is t1 and a read start time is t2, in the field period of the second field, a time at which the electronic shutter starts to stop is t3 and a read start time is t4, and in the field period of the third field, a time at which the electronic shutter starts to stop is t5 and a read start time is t6. The time at which the electronic shutter starts to stop is a charge accumulation start time and the read start time is a charge accumulation end time.

In the field periods of the first field and the third field, the charges generated in the photodiodes 401 which are under the filters in the even rows a in each column are read out, and in the field periods of the second field, the charges generated in the photodiodes 401 which are under the filters in the odd rows b in each column are read out.

Here, a first accumulation period is a period from t1 to t2, a second accumulation period is a period from t3 to t4, and a third accumulation period is a period from t5 to t6.

In this modification, for example, an average time of the first accumulation period (t1+t2)/2 is referred to as a "first accumulation time", an average time of the second accumulation period (t3+t4)/2 is referred to as a "second accumulation time", and an average time of the third accumulation period (t5+t6)/2 is referred to as a "third accumulation time".

Furthermore, a period from the first accumulation time to the second accumulation time is referred to as a "first period (T1)" and a period from the second accumulation time to the third accumulation time is referred to as a "second period (T2)".

Charges accumulated during the first accumulation period in the field period of the first field are referred to as a "signal charge q1" and charges accumulated during the third accumulation period in the field period of the third field are referred to as a "signal charge q3".

A signal charge accumulated in the field period of the second field is referred to as a "signal charge q2".

Since the length of the first period (T1) is different from the length of the second period (T2), when signal charges obtained in the field periods of the first field and the third field are simply added together, the accumulation time of a signal charge obtained by the simple addition does not match the second accumulation time of the signal charge q2. Thus, an image which is a result of addition of the signal charge obtained by the simple addition and the signal charge q2 may suffer from blurring.

In view of this, to prevent an image blur, weighted averaging of the signal charge q1 and the signal charge q3 which are obtained in the field periods of two different fields, respectively, is performed using the first period (T1) and the second period (T2). A signal charge (referred to as a "signal charge Q1") obtained by the weighted averaging is expressed by the following equation:

$$Q1=(T2 \times q1+T1 \times q3)/(T1+T2).$$

According to that, the accumulation time of the signal charge Q1 obtained by performing weighed averaging of the signal charge accumulated in the field period of the first field and the signal charge accumulated in the field period of the third field can be virtually made to match the accumulation time of the signal charge q2 accumulated in the field period of the second field.

Figure 17:
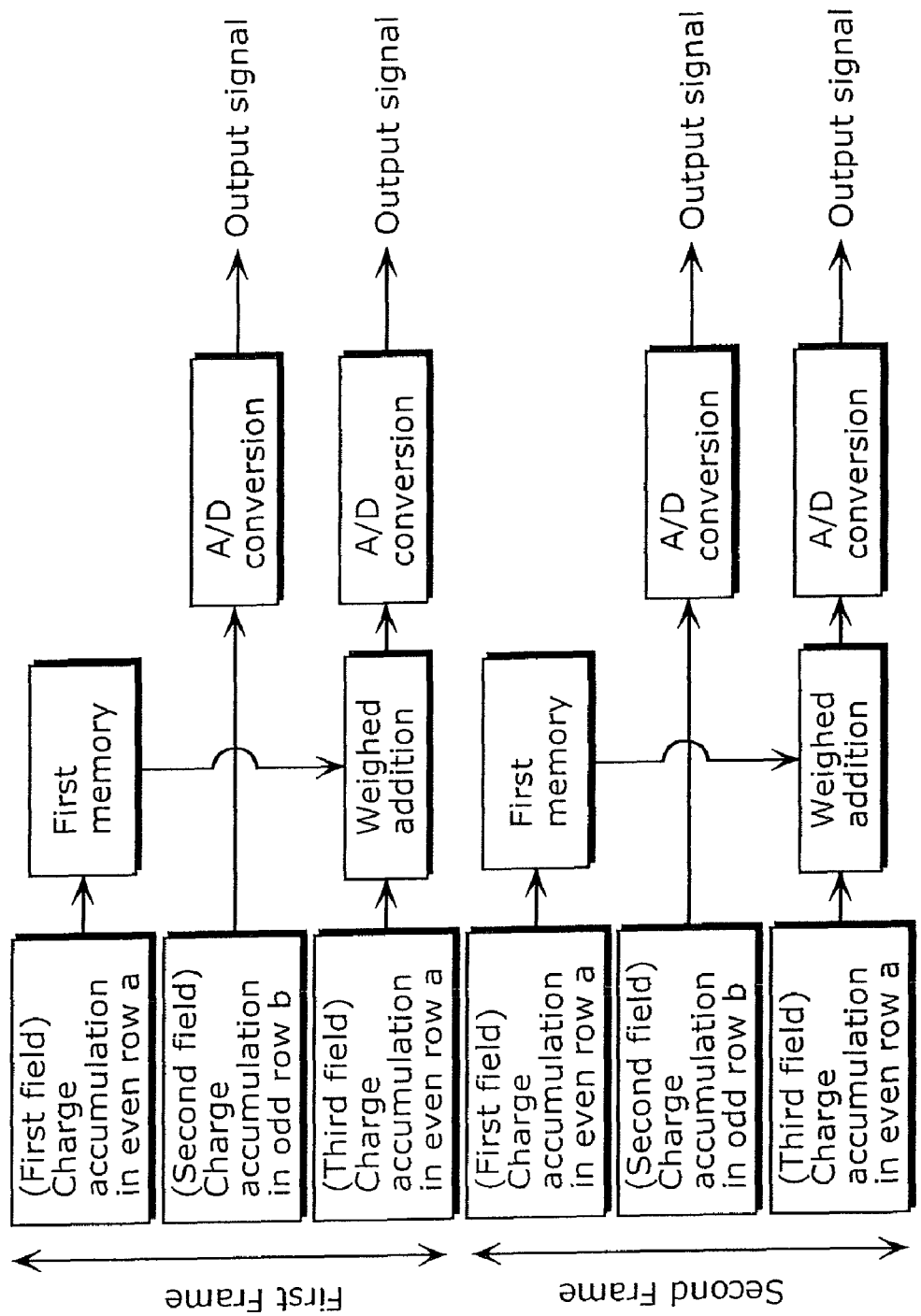
FIG. 17 is a chart showing steps of an operation of the solid-state imaging device, according to the modification of the first embodiment.

FIG. 17 is a chart showing steps of the operation of the solid-state imaging device according to the modification.

In the field period of the first field, the photodiodes 401 under the filters in the even rows a in each column accumulate the charge corresponding to the amount of incident light during a period between time t1 and t2 (first accumulation time) as the signal charge q1. The charge accumulated as the signal charge q1 is transferred to the vertical CCDs 403 through the first transfer gates 402 and further transferred to the first memory 404. The photodiodes 407 included in the first memory 404 accumulate the charges transferred from the corresponding photodiodes 401.

In the field period of the second field, the photodiodes 401 under the filters in the odd rows b in each column accumulate the charge corresponding to the amount of incident light during a period between time t3 and t4 (second accumulation period) as the signal charge q2. The charge accumulated as the signal charge q2 is transferred to the vertical CCDs 403 through the first transfer gates 402, further transferred to the vertical CCDs 405, further transferred to the horizontal CCD 409, and further transferred to the internal output unit 410. The internal output unit 410 converts the charge from the horizontal CCD 409, into a voltage value corresponding to the charges and outputs the obtained data to the A/D conversion unit 411. The A/D conversion unit 411 converts the value in the data from the horizontal CCD 409, the analog voltage value corresponding to the signal charge q2 accumulated in the field period of the second field, into a digital value. The selection unit 412 transfers the data including the value (the digital voltage value corresponding to the signal charge q2) obtained by the A/D conversion unit 411 to the second memory 413, and the second memory 413 holds the data including the digital voltage value corresponding to the signal charge q2.

In the field period of the third field, the photodiodes 401 under the filters in the even rows a in each column accumulate the charge corresponding to the amount of incident light during a period between time t5 and t6 (third accumulation period). The charge accumulated as the signal charge q3 is transferred to the vertical CCDs 403 through the first transfer gates 402 and further transferred to the first memory 404. The vertical CCDs 405 included in the first memory 404 perform weighted averaging of the signal charge q1 held in the photodiodes 407, which are obtained in the field period of the first field and the signal charge q3 transferred from the corresponding photodiodes 401, so as to obtain the signal charge Q1. A weighted averaging method used here is the same as that described above. The signal charge Q1 is transferred to the horizontal CCD 409 and thereafter transferred to the internal output unit 410. The internal output unit 410 converts the charge from the horizontal CCD 409, into a voltage value corresponding to the charge and outputs the obtained data to the A/D conversion unit 411. The A/D conversion unit 411 converts the value in the data from the horizontal CCD 409, the analog voltage value corresponding to the signal charge Q1 obtained by the weighted averaging of the signal charge q1 and the signal charge q3, into a digital value. The selection unit 412 transfers the data including the value (the digital voltage value corresponding to the signal charge Q1) obtained by the A/D conversion unit 411 to the second output unit 415, and the second output unit 415 outputs the data from the selection unit 412 (the data including the digital voltage value corresponding to the signal charge Q1) to outside of the solid-state imaging device. In addition, the first output unit 414 outputs the data held in the is second memory 413 (the data including the digital voltage value corresponding to the signal charge q2) to outside of the solid-state imaging device.

As described above, in the modification, in each column, for the pixels positioned in even rows, the charges generated in the field periods of the first field and the field period of the third field are added, and the digital data corresponding to the charge (the signal charge Q1) obtained by the weighted averaging is outputted to outside of the solid-state imaging device. On the other hand, for the pixels positioned in odd rows, the charges (the signal charge q2) generated in the field period of the second field are not added to the charges generated in other field periods, and the digital data corresponding to the signal charge q2 is outputted to outside the solid-state imaging device.

As such, even when the length of the first period (T1) is different from the length of the second period (T2), by performing weighted averaging of a signal charge q1 and a signal charge q3 which are obtained in the field periods of two different fields, respectively, using the first period (T1) and the second period (T2), the accumulation time of a signal charge Q1 is made to match the accumulation time of a signal charge Q2. With this, even when one frame includes three fields and the width of the vertical CCD 403 is narrowed down in order to suppress increase of smear, temporal resolution is not degraded when imaging a moving object. Therefore, an image blur when imaging a moving object can be prevented.

Furthermore, the length of the first period (T1) does not need to be made equal to the length of the second period (T2), which in turn eases constrains in design; accordingly, an advantageous effect that constraints in design are eased is also provided.

Note that, in the modification, in each column, for the pixels positioned in the even rows, weighted averaging of the charge generated in the field period of the first field (the signal charge q1) and the field period of the third field (signal charge q3) is performed, and the data including the value corresponding to the charge obtained by the weighted averaging (the signal charge Q1) is outputted to outside the solid-state imaging device. On the other hand, for the pixels positioned in the odd rows, the data including the value corresponding to the charge obtained in the field period of the second field (the signal charge q2) is outputted to outside of the solid-state imaging device. Thus, regarding the data value outputted to outside of the solid-state imaging device, the value for the pixels positioned in the even rows is higher than the value for the pixels positioned in the odd rows. Thus, an adjusting device which is provided outside of the solid-state imaging device, adjusts a value for each pixel, for each color, taking the type of color into consideration.

Furthermore, the "even rows" and the "odd rows" in the first embodiment may be replaced. More specifically, in each column, for the pixels positioned in the odd rows, weighted averaging of the charge generated in the field period of the first field (the signal charge q1) and the field period of the third field (the signal charge q3) is performed, and the data including the value corresponding to the charge obtained by the weighted averaging (the signal charge Q1) is outputted to outside the solid-state imaging device. On the other hand, for the pixels positioned in the even rows, the data including the value corresponding to the charge obtained in the field period of the second field (the signal charge q2) is outputted to outside of the solid-state imaging device.

In the modification, the description is made for an example of the color filters in primary colors of red (R), green (G), and blue (B) as the color filters arranged in the Bayer pattern. The color filters may be the color filters in complementary color filters of cyan (Cy), magenta (Mg), yellow (Ye), and green (G).

In addition, in the modification, the case where one frame includes three fields is described. However, one frame may include two or more than four fields.

Furthermore, although the case where the first accumulation period in the field period of the first field equals to the third accumulation period of the third field is described in the modification, the first accumulation period of the field period of the first field and the third accumulation period of the field period of the third field may be different. In such a case, the accumulation period of the first field and the accumulation period of the third field may be virtually matched by performing weighted averaging in the same manner described above.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The solid-state imaging devices and the driving method therefor of the present invention are useful for a solid-state imaging device having incorporated therein a solid-state imaging element, such as a CCD image sensor or a CMOS image sensor, to be used in a video movie camera, a digital still camera, a mobile camera, a medical camera, a surveillance camera, or the like, that provides good output image quality.

What is claimed is:

1. A driving method for a solid-state imaging device having pixels arranged in a matrix and color filters which are arranged in a Bayer pattern and are provided above each of the pixels, said method comprising:
for each row of the color filters arranged in the Bayer pattern,
holding, for a first pixel, a signal charge in a first holding unit, the signal charge being generated from incident light during an accumulation period of a field period which temporally precedes a predetermined field, out of two different fields located at a temporally equal distance from the predetermined field, the two different fields and the predetermined field being included in a frame;
holding, for a second pixel, a first signal charge in a second holding unit, the first signal charge being generated from incident light during an accumulation period of the predetermined field;
adding, for the first pixel, the signal charge held in the first holding unit and a signal charge which is generated from incident light during an accumulation period of a field which temporally follows the predetermined field out of the two different fields so as to obtain a second signal charge; and
outputting the first signal charge held in said second holding unit and the second signal charge obtained by said adding, to outside of said solid-state imaging device,
wherein an average time between a start time of the accumulation period of the temporally preceding field and a start time of the accumulation period of the temporally following field falls between a start time and an end time of the accumulation period of the predetermined field.

2. The driving method for the solid-state imaging device according to claim 1,
wherein the frame includes a temporal series of a first field, a second field, and a third field,
the predetermined field is the second field,
the temporally preceding field is the first field, and
the temporally following field is the third field.

3. The driving method for the solid-state imaging device according to claim 1,
wherein the frame and a frame which temporally immediately follows the frame each includes a temporal series of a first and second field,
the predetermined field is the second field of the frame,
the temporally preceding field is the first field of the frame, and
the temporally following field is the first field of the temporally immediately-following frame.

4. The driving method for the solid-state imaging device according to claim 1,
wherein the second pixel is of a color which corresponds to a wavelength at which sensitivity of the human eyes to color resolution is at a maximum.

5. The driving method for the solid-state imaging device according to claim 1,
wherein the color filters are color filters in primary colors, and
the second pixel is green.

6. The driving method for the solid-state imaging device according to claim 1,
wherein the color filters are color filters in complementary colors, and
the second pixel is green or yellow.

7. The driving method for the solid-state imaging device according to claim 1,
wherein an average time between an end time of the accumulation period of the temporally preceding field and an end time of the accumulation period of the temporally following field falls between a start time and an end time of the accumulation period of the predetermined field.

* * * * *